United States Patent
Ishii et al.

(10) Patent No.: US 8,699,364 B2
(45) Date of Patent: Apr. 15, 2014

(54) RADIO BASE STATION DEVICE, RADIO RELAY STATION DEVICE, AND RADIO TERMINAL DEVICE

(75) Inventors: Yoshikazu Ishii, Kanagawa (JP); Takeshi Kanazawa, Kanagawa (JP)

(73) Assignee: Panasonic Corporation, Osaka (JP)

(*) Notice: Subject to any disclaimer, the term of this patent is extended or adjusted under 35 U.S.C. 154(b) by 581 days.

(21) Appl. No.: 13/000,947

(22) PCT Filed: May 8, 2009

(86) PCT No.: PCT/JP2009/002027
§ 371 (c)(1),
(2), (4) Date: Dec. 22, 2010

(87) PCT Pub. No.: WO2009/157124
PCT Pub. Date: Dec. 30, 2009

(65) Prior Publication Data
US 2011/0110258 A1    May 12, 2011

(30) Foreign Application Priority Data
Jun. 25, 2008 (JP) .................... 2008-165536

(51) Int. Cl.
*G01R 31/08* (2006.01)
(52) U.S. Cl.
USPC .................................. 370/252; 370/226
(58) Field of Classification Search
USPC ................................. 370/226, 252
See application file for complete search history.

(56) References Cited

U.S. PATENT DOCUMENTS

| 7,321,772 | B2 | 1/2008 | Morimoto |
| 8,275,387 | B2 | 9/2012 | Morimoto |
| 2003/0176192 | A1 | 9/2003 | Morimoto |
| 2007/0060192 | A1 | 3/2007 | Morimoto |
| 2009/0143075 | A1 | 6/2009 | Morimoto |

FOREIGN PATENT DOCUMENTS

| CN | 1442972 | 9/2003 |
| JP | 2008-104096 | 5/2008 |

OTHER PUBLICATIONS

Office Action dated JanUary 21, 2013 with English translation.
International Search Report dated Jun. 16, 2009.
3GPP TS 36.300 V8.5.0, "Evolved Universal Terrestrial Radio Access (E-UTRA) and Evolved Universal Terrestrial Radio Access Network (E-UTRAN); Overall description; Stage 2 (Release 8)," May 2008, cover page and pp. 49-50.

(Continued)

*Primary Examiner* — Thomas Dailey
*Assistant Examiner* — Ebrahim Golabbakhsh
(74) *Attorney, Agent, or Firm* — Dickinson Wright PLLC

(57) ABSTRACT

A radio base station device comprises: a preamble signal receiving unit (15) that receives a RACH preamble signal transmitted from a radio terminal device; a reception notice receiving unit (16) that receives, from a radio relay station device, a reception notice indicating that the radio relay station device has received the RACH preamble signal; and a response signal transmitting unit (18) which, when an identifier (RA-ID) of the RACH preamble signal transmitted from the radio terminal device matches an identifier comprised in the preamble reception notice transmitted from the radio relay station device, permits the use of an identifier by the radio relay station device and transmits, to the radio terminal device, a RACH response signal (RACH Response) comprising a cell identifier (Cell ID) of a cell managed by the radio relay station device permitted to use the identifier. Accordingly, the latency when establishing a connection can be reduced.

23 Claims, 23 Drawing Sheets

(56) References Cited

OTHER PUBLICATIONS

3GPP TS 36.321 V8.1.0, "Evolved Universal Terrestrial Radio Access (E-UTRA) Medium Access Control (MAC) protocol specification (Release 8)," Mar. 2008, pp. 1-30, p. 2, Line 4.

3GPP TSG-RAN2#61, "Cell reselection during RRC Connection Establishment," Motorola, et al., Tdoc R2-081107, Feb. 2008, pp. 1-9, p. 3, Line 3.

3GPP TS 36.331 V8.1.0, "Evolved Universal Terrestrial Radio Acces (E-UTRA) Radio Resource Control (RRC); Protocol specification (Release 8)," Mar. 2008, pp. 1-122, p. 3, Line 18.

Draft IEEE Standard for Local and metropolitan area networks, "Part 16: Air Interface for Fixed and Mobile Broadband Wireless Access Systems: Multihop Relay Specification," IEEE P802.16j/D1, Aug. 2007, pp. i-ix, xi-xiv, 1-226, p. 4, Line 7.

D. Schultz, et al., "Relaying concepts and supporting actions in the context of CGs," IST-4-027756 Winner II, D3.5.1 v1.0, Oct. 2006, pp. 105, p. 4, Line 9.

Group 1: Sequence No. 0-63
Sub group A: Sequence No. 0-31
Sub group B: Sequence No. 32-47
Sub group C: Sequence No. 48-63

RADIO BASE STATION DEVICE, RADIO RELAY STATION DEVICE, AND RADIO TERMINAL DEVICE

RELATED APPLICATION

The present application is based upon and claims the benefit of priority from Japanese Patent Application No. 2008-165536, filed on Jun. 25, 2008, the disclosure of which is incorporated herein in its entirety by reference.

TECHNICAL FIELD

The present invention relates to a wireless communication system comprising a radio base station device (eNodeB), a radio relay station device (Relay Node: also referred to as a Relay Station, a Repeater, and the like), and a radio terminal device (UE). More particularly, the present invention relates to a wireless communication system capable of reducing latency when establishing a communication connection and reducing the period of time until a radio terminal device starts communication.

BACKGROUND ART

The recent progress in wider bandwidths and faster data rates in mobile radio communication services has led to the realization of multimedia services such as music and video. With an aim of realizing even faster data services, 3GPP, a standards body of mobile communication technology, is in the process of standardizing mobile communication technology referred to as LTE (Long Term Evolution) which is capable of realizing data rates in excess of 100 Mbps.

In LTE, when an idle radio terminal receives a paging message or when a radio terminal initiates data transmission, a random access procedure using a random access channel (RACH) is performed for the purpose of establishing a connection with a radio communication base station device (3GPP Specification TS36.321. v8.1.0, "Medium Access Control specification").

As illustrated in FIG. 23, a random access procedure is made up of four messages: A random access preamble signal (hereinafter referred to as a "RACH preamble signal", and also referred to as a Message 1 in the present specification) and a random access response signal (hereinafter referred to as a "RACH response signal", and also referred to as a Message 2 in the present specification) are MAC (Media Access Control) layer signals. An RRC connection request signal (RRC Connection Request, also referred to as a Message 3 in the present specification) and an RRC connection setup signal (RRC Connection Setup, also referred to as a Message 4 in the present specification) are RRC (Radio Resource Control) layer signals.

Basically, a radio terminal selects a cell having a best reception signal level (best cell) and accesses the selected cell. Since a radio terminal remains in motion even when the random access procedure is in progress, a reception signal level of a cell attempting connection constantly varies. Therefore, a switchover to another cell may take place during a random access.

FIG. 24 is a diagram illustrating a sequence in the present LTE for performing a cell reselection during a random access procedure. Even after transmitting a RACH preamble signal to a radio base station device 100a of a first cell, a radio terminal device 110 continues detection of reception signal levels of the first cell and an adjacent second cell. In this case, a detection of a reception signal level is referred to as a cell reselection evaluation.

For example, there may be cases where an RRC connection setup signal message cannot be received and an RRC connection failure occurs despite transmitting a RACH preamble signal for a maximum number of transmissions or retransmitting an RRC connection request signal for a maximum number of retransmissions. In such a case, if the second cell is the best cell at this point, then cell reselection is performed to the second cell (3GPP TSG RAN WG2 Document, R2-081107 "Cell Reselection during RRC Connection Establishment"). In the example illustrated in FIG. 24, after the RRC connection failure, the radio terminal device 110 transmits a RACH preamble signal to a radio base station device 100b of the second cell.

In order to once again transmit a RACH preamble signal in the second cell that is the destination, the radio terminal device 110 must acquire parameters necessary for the RACH preamble signal. Parameters necessary for the RACH preamble signal are comprised in system information regularly announced by the radio base station device (eNodeB) 100b. System information is information for announcing parameters used by the respective cells.

Therefore, the radio terminal device 110 having performed a cell reselection must receive system information in order to acquire a preamble parameter used by the new cell. In LTE currently being specified, a preamble parameter is announced in an SIB2 (System Information Block 2) at a frequency of 160 ms (3GPP Specification TS36.331 v8.1.0, "Evolved Universal Terrestrial Radio Access (E-UTRA) Radio Resource Control (RRC) Protocol Specification"). This means that the radio terminal device 110 having performed a cell reselection must wait for a maximum of 160 ms before transmitting a RACH preamble signal. Such a delay may significantly increase the latency before a connection is established.

An evaluation of an IMT-Advanced system as a next-generation cellular communication system has been started. Compared to current systems, high frequency bands (3.4 to 3.6 GHz) are also allocated for the IMT-Advanced system. With the IMT-Advanced system, a cell radius may conceivably decrease due to the use of higher frequency bands. Accordingly, as illustrated in FIG. 25, the deployment of a radio relay station device 120 at a cell edge of the radio base station device 100 is being considered for IMT-Advanced for the purpose of improving cell edge performance and expanding cell coverage.

Since cell density is increased in a next-generation cellular communication network in which the radio relay station device 120 is deployed as described above, an increase in frequency of the aforementioned cell reselection during a random access procedure as well as an increase in latency upon connection establishment are predicted (IEEE P802.16j/DI (August 2007) "Part 16: Interface for Fixed and Mobile Broadband Wireless Access Systems", IST-4-027756 WINNER II, D3.5.1 v1.0 "Relaying concepts and supporting actions in the context of CUs").

SUMMARY OF THE INVENTION

Technical Problem

As described above, with a cellular communication system comprising the radio relay station device 120, an increase in frequency of cell reselections during a random access procedure as well as deterioration in latency upon connection establishment are predicted.

The present invention has been made in consideration of the above, and an object thereof is to provide a radio base station device, a radio relay station device, and a radio terminal device which reduce latency upon connection establishment when a conventional random access procedure is applied to a cellular radio system to which the radio relay station device has been introduced.

Solution to Problem

A radio base station device, a radio relay station device, and a radio terminal device according to the present invention is applicable to a wireless communication system comprising a radio base station device (eNodeB) that controls communication with a radio terminal device (User Equipment) and a radio relay station device (Relay Node) that relays communication between the radio base station device and the radio terminal device.

A radio base station device according to the present invention comprises: a preamble signal receiving unit that receives a RACH preamble signal transmitted from the radio terminal device; a reception notice receiving unit that receives, from the radio relay station device, a reception notice indicating that the radio relay station device has received the RACH preamble signal; and a response signal transmitting unit which, when a random access identifier (RA-ID) of a RACH preamble signal transmitted from the radio terminal device matches a random access identifier comprised in the reception notice transmitted from the radio relay station device, permits the use of the random access identifier by the radio relay station device and transmits, to the radio terminal device, a RACH response signal comprising a cell identifier (Cell ID) of a cell managed by the radio relay station device permitted to use the random access identifier.

A radio relay station device according to the present invention comprises: a preamble signal receiving unit that receives a RACH preamble signal transmitted from the radio terminal device to the radio base station device; a reception notice transmitting unit that transmits, to the radio base station device, a reception notice which indicates that the RACH preamble signal has been received and which comprises a random access identifier of the RACH preamble signal; a permission identifier storage unit that stores, when a permission to use the random access identifier comprised in the RACH preamble signal has been granted by the radio base station device, a random access identifier comprised in the RACH preamble signal; a random access identifier judging unit that judges, upon reception of the RACH preamble signal, whether or not a random access identifier in the RACH preamble signal matches the random access identifier stored in the permission identifier storage unit; and a response signal transmitting unit which transmits, when the random access identifier judging unit judges that the random access identifiers match each other, a RACH response signal corresponding to the RACH preamble signal to the radio terminal device.

A radio terminal device according to the present invention comprises: a preamble signal transmitting unit that transmits a RACH preamble signal; an RRC control unit that transmits, upon receiving the RACH response signal transmitted from the radio base station device in response to the RACH preamble signal, an RRC connection request to the radio base station device; and a best cell searching unit that searches, when an RRC connection by the RRC connection request fails, a best cell whose reception quality is the best, wherein the preamble signal transmitting unit transmits, when a cell identifier of the best cell matches a cell identifier comprised in the RACH response signal, a RACH preamble signal comprising a random access identifier comprised in the RACH response signal.

As will be described below, the present invention also comprises other aspects. As such, the disclosure of the present invention is intended to provide a part of the present invention and is not intended to limit the scope of the present invention as described and claimed herein.

DESCRIPTION OF EMBODIMENTS

Figure 1:
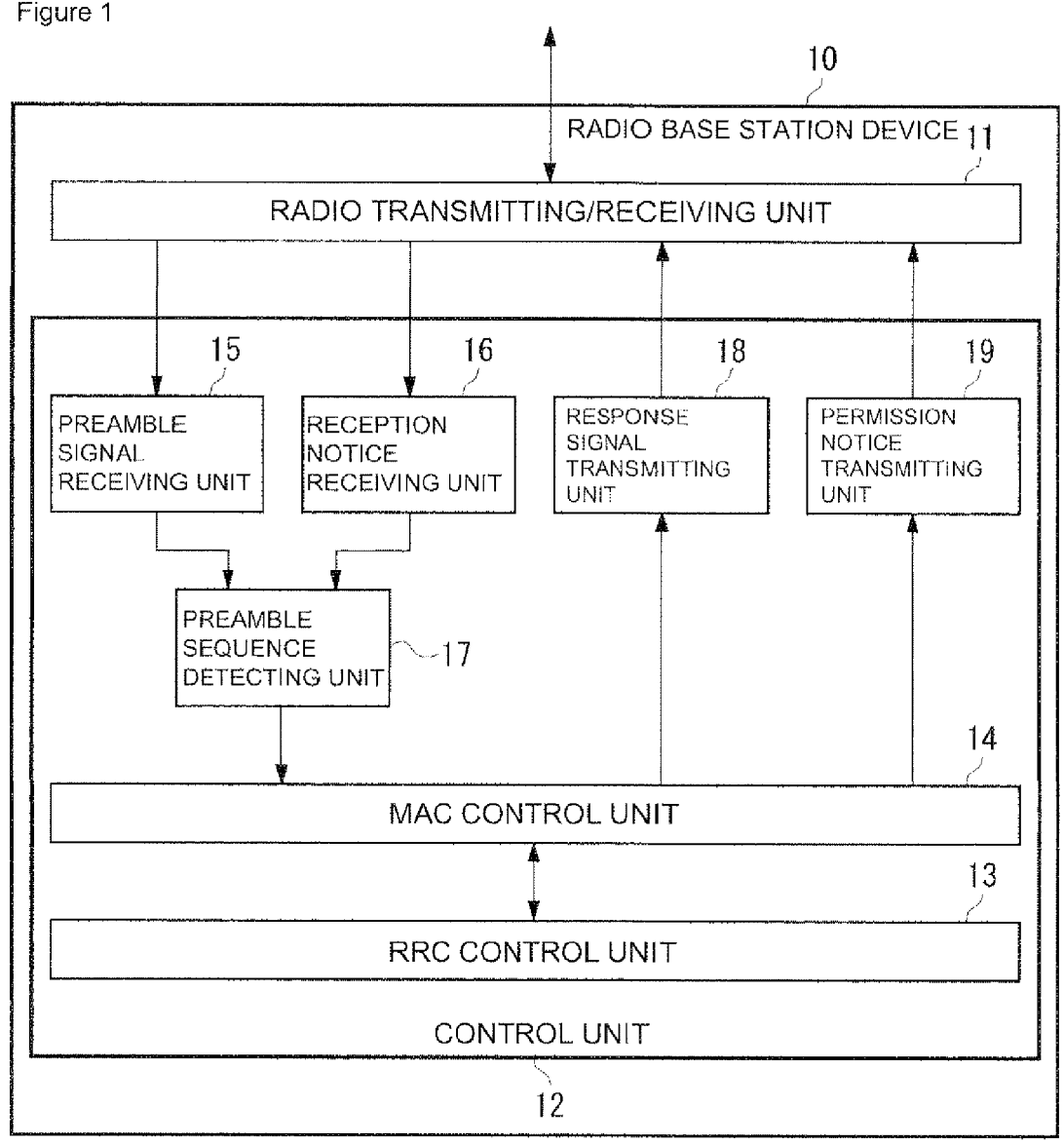
FIG. 1 is a diagram illustrating a configuration of a radio base station device according to a first embodiment.

Hereinafter, a detailed description of the present invention will be given. It is to be understood that the embodiments of the present invention described hereinafter are illustrative only and various modifications can be made thereon. As such, the specific configurations and functions disclosed below are not intended to limit the scope of the present invention.

A radio base station device, a radio relay station device, and a radio terminal device according to the present embodiment is applicable to a wireless communication system comprising a radio base station device (eNodeB) that controls communication with a radio terminal device (User Equipment) and a radio relay station device (Relay Node) that relays communication between the radio base station device and the radio terminal device. Hereinafter, the radio base station device, the radio relay station device, and the radio terminal device which constitute the wireless communication system according to the present embodiment will be described.

(System)

The radio relay station device comprises: a preamble signal receiving unit that receives a RACH preamble signal transmitted from the radio terminal device to the radio base station device; and a reception notice transmitting unit that transmits, to the radio base station device, a reception notice which indicates that the RACH preamble signal has been received and which comprises a random access identifier of the RACH preamble signal. Accordingly, the radio relay station device receives a RACH preamble signal transmitted from the radio terminal device to the radio base station device, and notifies the radio base station device that the RACH preamble signal has been received.

The radio base station device comprises: a preamble signal receiving unit that receives a RACH preamble signal transmitted from the radio terminal device; a reception notice receiving unit that receives a reception notice transmitted from the radio relay station device; and a response signal transmitting unit which, when a random access identifier (RA-ID) of the RACH preamble signal transmitted from the radio terminal device matches a random access identifier comprised in the reception notice transmitted from the radio relay station device, permits the use of the random access identifier by the radio relay station device and transmits, to the radio terminal device, a RACH response signal comprising a cell identifier (Cell ID) of a cell managed by the radio relay station device permitted to use the random access identifier. Accordingly, by comparing random access identifiers upon receiving a RACH preamble signal from the radio terminal device and a preamble reception notice from the radio relay station device, the radio base station device judges whether the RACH preamble signal received by the radio relay station device and the RACH preamble signal received by the radio base station device match each other. When it is judged that the RACH preamble signals match each other, since it is assumed that the radio terminal device is at a position where communication with the radio relay station device can be performed, permission to use the random access identifier is granted to the radio relay station device.

The radio relay station device comprises a permission identifier storage unit that stores, when a permission to use a random access identifier comprised in the RACH preamble signal has been wanted by the radio base station device, a random access identifier comprised in the RACH response signal. The radio terminal device comprises: an RRC control unit that transmits, upon receiving a RACH response signal transmitted from the radio base station device, an RRC connection request to the radio base station device; a best cell searching unit that searches, when an RRC connection by the RRC connection request fails, a best cell whose reception quality is the best; and a preamble signal transmitting unit that transmits, when a cell identifier of the best cell matches a cell identifier comprised in the RACH response signal, a RACH preamble signal comprising a random access identifier comprised in the RACH response signal. In addition, the radio relay station device comprises: a random access identifier judging unit that judges, upon receiving a RACH preamble signal transmitted from the radio terminal device, whether or not a random access identifier in the RACH preamble signal matches a random access identifier stored in the permission identifier storage unit; and a response signal transmitting unit which transmits, when it is judged that the random access identifiers match each other, a RACH response signal corresponding to the RACH preamble signal to the radio terminal device.

When an RRC connection from the radio terminal device to the radio base station device fails, a RACH preamble signal is once again transmitted to the best cell. In doing so, when the radio relay station device managing the best cell is a radio relay station device that is permitted to use a random access identifier of the RACH preamble signal transmitted earlier to the radio base station device, a RACH preamble signal comprising the random access identifier can be used. Accordingly, since a RACH preamble signal can be generated without having to receive system information transmitted from the best cell, the latency upon establishing a connection can be reduced.

The radio base station device according to the present embodiment comprises a permission notice transmitting unit that transmits a permission notice indicating that permission to use the random access identifier has been granted to the radio relay station device. The radio relay station device according to the present embodiment comprises a permission notice receiving unit that receives the permission notice from the radio base station device, and is configured such that a random access identifier comprised in the permission notice received by the permission notice receiving unit is stored in the permission identifier storage unit.

As described above, by transmitting a permission notice of a random access identifier from the radio base station device to the radio relay station device, the radio relay station device can acknowledge that the use of the random access identifier has been permitted.

The radio relay station device according to the present embodiment comprises a response signal receiving unit that receives a RACH response signal transmitted from the radio base station device to the radio terminal device, and is configured such that when a RACH response signal received by the response signal receiving unit comprises a cell identifier of a cell managed by the radio relay station device, the radio relay station device stores a random access identifier comprised in the RACH response signal in the permission identifier storage unit.

As described above, by analyzing the contents of a RACH response signal transmitted from the radio base station device to the radio terminal device, the radio relay station device can acknowledge that the use of the random access identifier has been permitted. In this case, a permission notice from the radio base station device to the radio relay station device becomes unnecessary.

The radio base station device according to the present embodiment is configured so that the radio base station device awaits a preamble reception notice from the radio relay station device until a predetermined period of time lapses from the reception of a RACH preamble signal transmitted from the radio terminal device.

Due to this configuration, the radio base station device can appropriately receive a preamble reception notice that is likely to be transmitted from the radio relay station device.

The radio base station device according to the present embodiment is configured so that when preamble reception notices comprising the same random access identifier is received from a plurality of radio relay station devices, the radio base station device permits the use of the random access identifier to a radio relay station device selected from the plurality of radio relay station devices.

Due to this configuration, the likelihood increases in which the radio relay station device having been granted permission to use the random access identifier is searched as a best cell.

The radio base station device according to the present embodiment is configured such that the response signal transmitting unit judges whether or not the radio relay station device that is the transmission source of the preamble reception notice is the radio relay station device permitted to use the random access identifier, and when the radio relay station device is the radio relay station device permitted to use the random access identifier, the response signal transmitting unit does not transmit a RACH response signal to the radio terminal device.

When the radio relay station device permitted to use the random access identifier receives a RACH preamble signal, the radio relay station device transmits a RACH response signal. Therefore, by adopting a configuration in which the radio base station device does not transmit a RACH response signal, redundant transmissions of the RACH response signal can be avoided.

The radio relay station device according to the present embodiment comprises a transmitting unit that transmits to a radio base station device, when the random access identifier judging unit judges that a random access identifier of a RACH preamble signal transmitted from the radio terminal device and a random access identifier stored in the permission identifier storage unit match each other, a notice indicating that a transmission of a RACH response signal corresponding to a RACH preamble signal is unnecessary. The radio base station device according to the present embodiment is configured such that when a notice indicating that a transmission of the RACH response signal corresponding to the RACH response signal is unnecessary is received from the radio relay station device permitted to use the random access identifier, a RACH response signal is not transmitted to the radio terminal device.

When the radio relay station device permitted to use the random access identifier receives a RACH preamble signal, the radio relay station device transmits a RACH response signal. Therefore, by adopting a configuration in which a notice indicating that a RACH response is unnecessary is transmitted from the radio relay station device to the radio base station device, redundant transmissions of a RACH response signal can be avoided.

The radio base station device according to the present embodiment is configured such that the response signal transmitting unit transmits a RACH response signal that comprises: a reference value of a transmission power of a RACH preamble signal specified by the radio relay station device permitted to use the random access identifier; and a transmission power (RSTP: Reference Symbol Transmission Power) of a pilot signal transmitted from the radio relay station device. In addition, the radio terminal device according to the present embodiment is configured such that based on a reference value of a transmission power of a RACH preamble signal comprised in the RACH response signal and on a transmission power of a pilot signal, the preamble signal transmitting unit transmits a RACH preamble signal at a transmission power that is receivable by the radio relay station device but not receivable by the radio base station device. The radio relay station device according to the present embodiment comprises a response signal monitoring unit that monitors, when the random access identifier judging unit judges that a random access identifier of the RACH preamble signal transmitted from the radio terminal device and a random access identifier stored in the permission identifier storage unit match each other, whether or not a RACH response signal corresponding to the RACH preamble signal has been transmitted from the radio base station device to the radio terminal device. The radio relay station device is configured such that when a RACH response signal has not been transmitted within a predetermined period of time, the response signal transmitting unit transmits a RACH response signal corresponding to the RACH preamble signal to the radio terminal device.

The radio base station device according to the present embodiment is configured such that based on a reception level comprised in a preamble reception notice and reception characteristics of the radio relay station device, the response signal transmitting unit comprises, in a RACH response signal, a control parameter for controlling a transmission power of a RACH preamble signal to be transmitted from the radio terminal device to the radio relay station device, and transmits the RACH response signal. In addition, the radio terminal device according to the present embodiment is configured such that based on a control parameter comprised in the RACH response signal, the preamble signal transmitting unit transmits a RACH preamble signal at a transmission power that is receivable by the radio relay station device but not receivable by the radio base station device. The radio relay station device according to the present embodiment comprises: a reception level detecting unit that detects a reception level of a RACH preamble signal; and a response signal monitoring unit that monitors, when the random access identifier judging unit judges that a random access identifier of the RACH preamble signal transmitted from the radio terminal device and a random access identifier stored in the permission identifier storage unit match each other, whether or not a RACH response signal corresponding to the RACH preamble signal has been transmitted from the radio base station device to the radio terminal device, and the radio relay station device is configured such that the preamble reception notice transmitting unit comprises a reception level of the RACH preamble signal into a preamble reception notice and transmits the preamble reception notice to the radio base station device, and the response signal transmitting unit transmits, when a RACH response signal has not been transmitted within a predetermined period of time, a RACH response signal corresponding to the RACH preamble signal to the radio terminal device.

Due to the configurations described above, a RACH preamble signal using a random access identifier for which continuous use has been permitted will reach a radio relay station device but not a radio base station device. Therefore, since the base station can acknowledge that the transmission of a random access identifier for which use has been permitted involves a RACH preamble signal from a different radio terminal device that just so happened to use the same random access identifier, the base station is able to return a RACH response signal in an appropriate manner. The radio relay station device monitors whether or not a RACH response signal has been transmitted from the radio base station device to the radio terminal device, and only returns a RACH response signal to the radio terminal device when a RACH response signal is not transmitted from the radio base station device. Therefore, the radio relay station device does not transmit a RACH response signal to a different radio terminal device that just so happened to use the same random access identifier.

The radio base station device according to the present embodiment comprises a permission termination notice transmitting unit that transmits, upon the lapse of a predetermined period of time after the transmission of a permission notice from the permission notice transmitting unit to the radio relay station device, a notice indicating a termination of a permission to use the random access identifier granted to the radio relay station device. The radio relay station device according to the present embodiment is configured such that upon receiving a permission termination notice which is transmitted from the radio base station device and which notifies the termination of permission to use the random access identifier, the radio relay station device erases a random access identifier corresponding to the permission termination notice from the permission identifier storage unit.

According to such a configuration, the period of time in which complicated processing associated with the permission to use a random access identifier granted to the radio relay station device is performed can be limited.

Next, the wireless communication system, the radio base station device, the radio relay station device, and the radio terminal device according to the present embodiment will be described in detail with reference to the drawings.

First Embodiment

Figure 2:
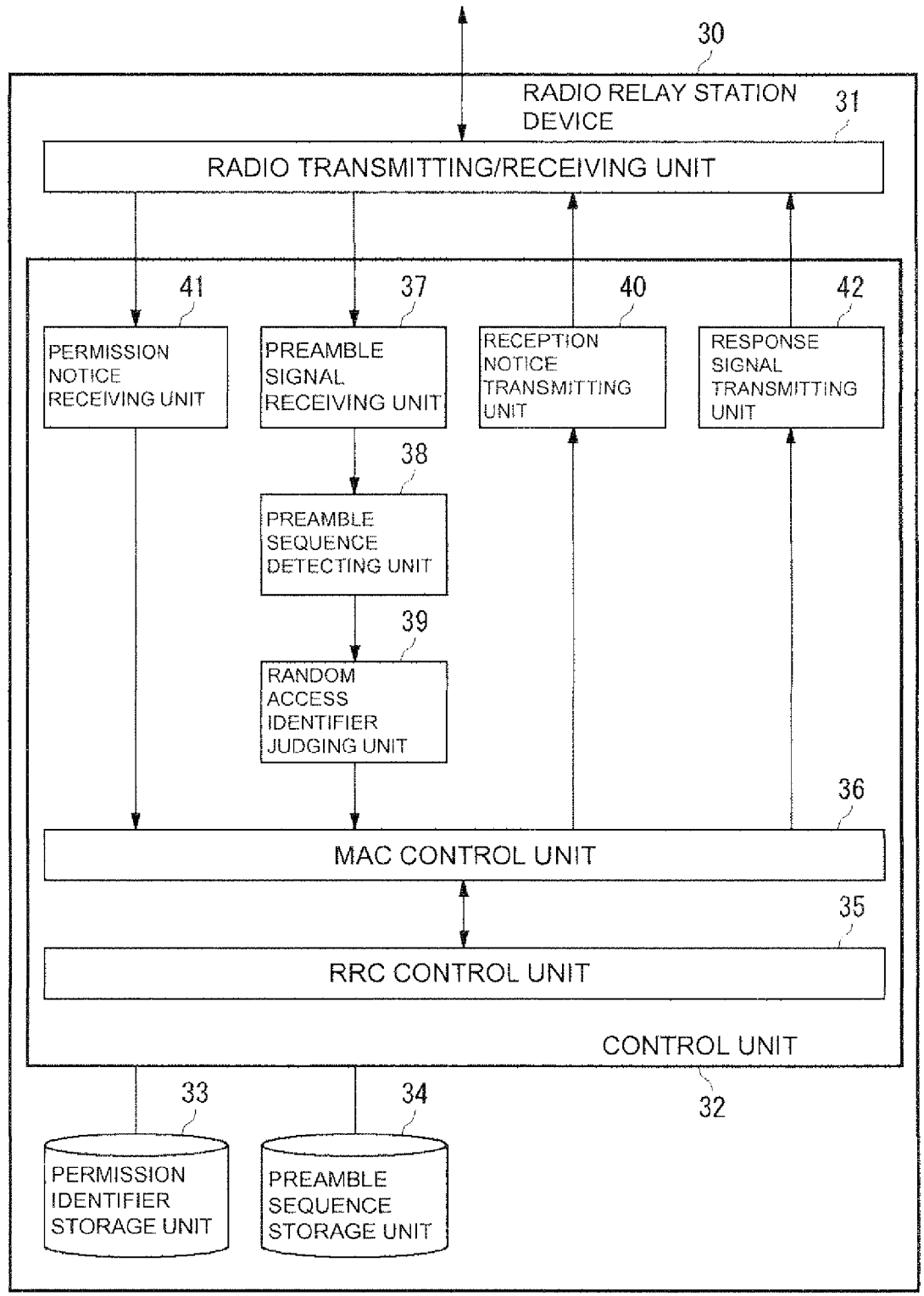
FIG. 2 is a diagram illustrating a configuration of a radio relay station device according to the first embodiment.
Figure 3:
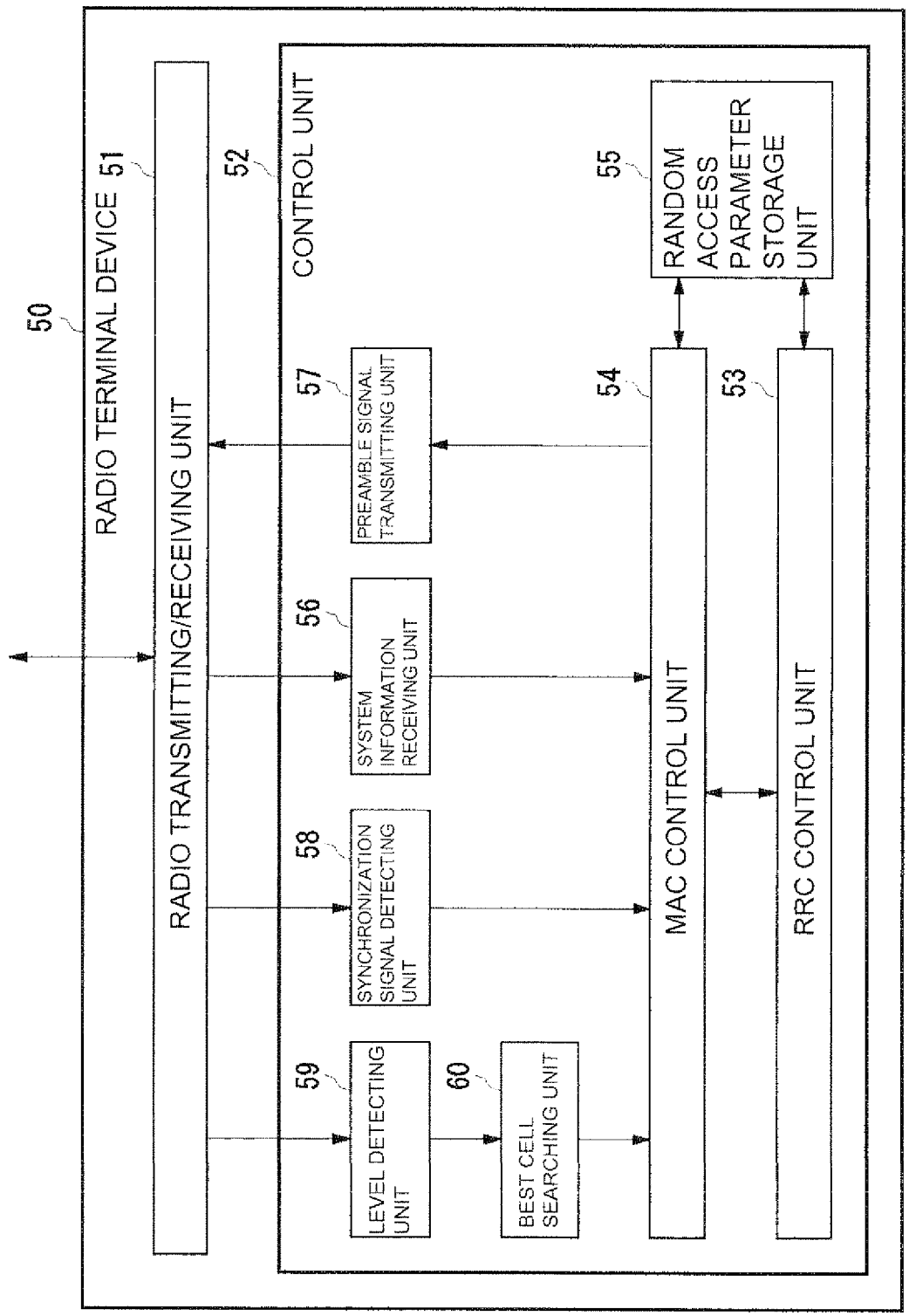
FIG. 3 is a diagram illustrating a configuration of a radio terminal device according to the first embodiment.
Figure 4:
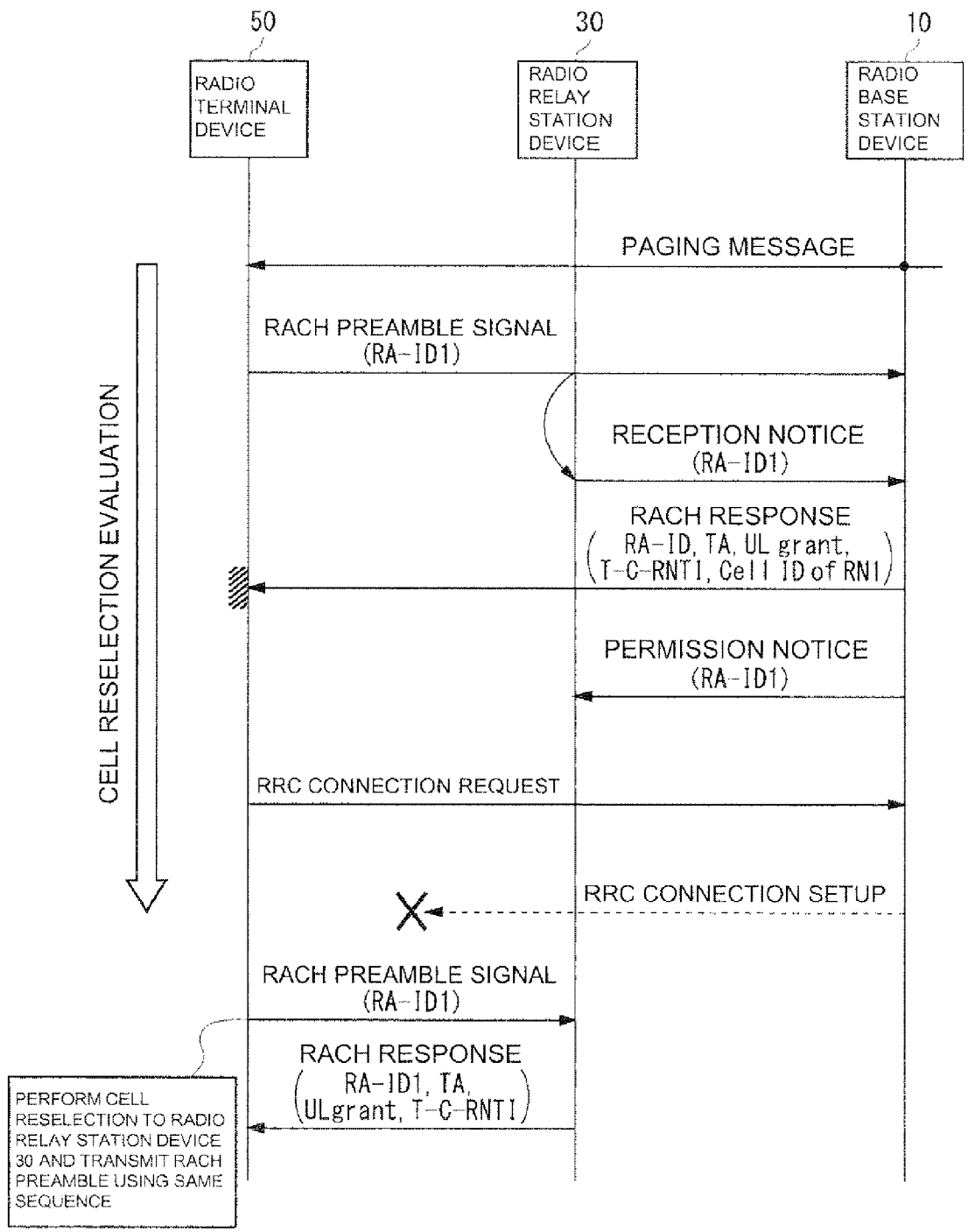
FIG. 4 is a sequence diagram illustrating a random access procedure according to the first embodiment.

FIG. 1 is a diagram illustrating a configuration of a radio base station device 10 according to a first embodiment, FIG. 2 is a diagram illustrating a configuration of a radio relay station device 30 according to the first embodiment, and FIG. 3 is a diagram illustrating a radio terminal device 50 according to the first embodiment. In addition, FIG. 4 is a sequence diagram illustrating a random access procedure according to the first embodiment. A random access procedure according to the first embodiment and operations of the radio base station device 10, the radio relay station device 30, and the radio terminal device 50 will now be described with reference to FIGS. 1 to 4.

Hereinafter, an example will be considered wherein the radio terminal device 50, which exists within the coverage of the radio base station device 10 and is in a standby state (idle mode) in which the radio terminal device 50 is connected to the radio base station device 10, is paged from a network and starts communication. Moreover, even in a case where the radio terminal device 50 starts communication on its own initiative, a random access procedure is to be performed in the same manner as in the example described below.

As illustrated in FIG. 4, upon receiving a paging message, the radio terminal device 50 transmits a RACH preamble signal in order to establish a channel for transmitting/receiving data to/from the radio base station device 10. For example, a parameter unique to a cell is used as the RACH preamble signal. Examples of the parameter comprise a preamble transmission slot and a preamble transmission power. Such parameters are announced, in advance, to the radio terminal device 50 within the area from the radio base station device 10 in the form of specific system information such as SIB2 (System Information Block 2) in the case of LTE.

The radio terminal device 50 receives the system information transmitted from the radio base station device 10 by system information receiving unit 56. An RRC control unit 53 of the radio terminal device 50 detects a parameter used by the cell and stores the parameter in a random access parameter (RACH Parameter) storage unit 55. A MAC control unit 54 having received a trigger for a random access procedure from the RRC control unit 53 generates a RACH preamble signal using the cell-specified random access parameter. The radio terminal device 50 transmits the generated RACH preamble signal from a preamble signal transmitting unit 57.

Figure 5:
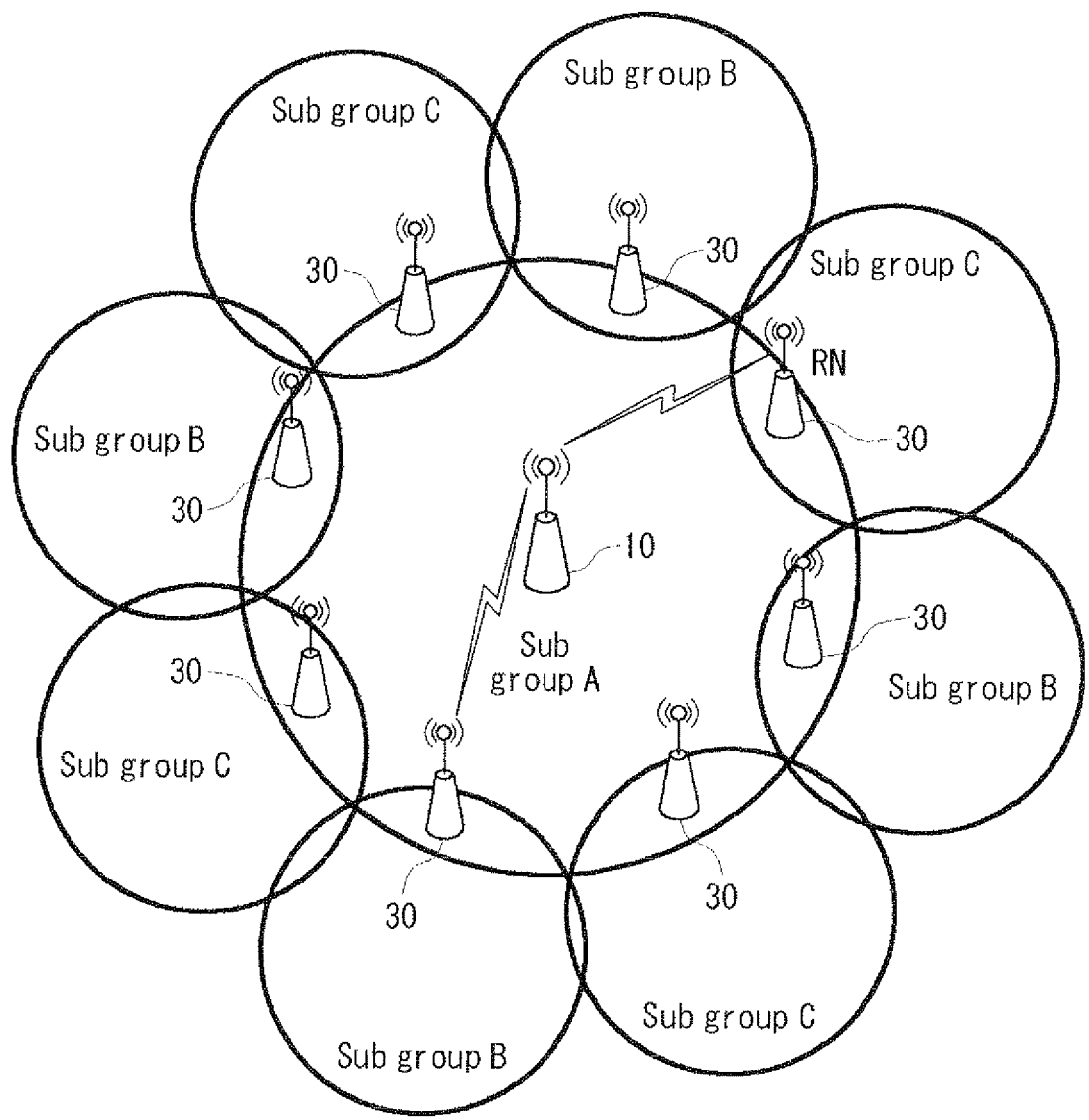
FIG. 5 is a diagram illustrating an example where different sequence subgroups have been allocated to adjacent cells.

A preamble sequence (hereinafter referred to as a "sequence") to be used in a random access will now be described. A plurality of sequences are assigned to a single cell. Different sequences are to be respectively assigned to the radio base station device 10 and the radio relay station device 30. While 64 sequences are assigned to a single cell in LTE, 64 different sequences may be respectively assigned to the radio base station device 10 and each radio relay station device 30. In addition, for example, as illustrated in FIG. 5, 64 sequences may be divided into a plurality of subgroups so as to have different sequences assigned to adjacent cells. The MAC control unit 53 of the radio terminal device 50 generates a RACH preamble signal using an arbitrary sequence selected from the plurality of assigned sequences.

In the present embodiment, the radio base station device 10 and the radio relay station device 30 that serves under the radio base station device 10 or, in other words, the radio relay station device 30 connected via a radio channel to the radio base station device 10 use random access parameters with the same preamble transmission slot. Accordingly, the radio relay station device 30 is able to receive a RACH preamble signal transmitted from the radio terminal device 50 to the radio base station device 10. Even when the radio terminal device 50 exists on a cell edge of the radio base station device 10 and the radio base station device 10 is unable to directly receive a RACH preamble signal from the radio terminal device 50, reception sensitivity of the RACH preamble signal can be improved by having the radio relay station device 30 receive the RACH preamble signal by proxy.

A transmission source of a RACH preamble signal can be determined by assigning different sequences to adjacent cells. There may be cases where the radio terminal device 50 exists on a cell boundary and the radio base station device 10 managing the cell or the radio relay station device 30 both receive a RACH preamble signal. In this case, the cell to which the radio terminal device 50 is connected can be determined from a sequence used in the RACH preamble signal. Moreover, the sequence used in the RACH preamble signal corresponds to a random access identifier (RA-ID: Random Identity). Accordingly, since it is possible to distinguish the cell to which is connected the radio terminal device 50 that is a transmission source of a RACH preamble signal, redundant allocation of radio resources to a single radio terminal device 50 by a plurality of radio base station devices 10 or radio relay station devices 30 can be prevented.

As illustrated in FIG. 2, the radio relay station device 30 comprises a preamble sequence storage unit 34 that stores sequences used by the radio base station device 10. The radio relay station device 30 receives, by a preamble signal receiving unit 37, a RACH preamble signal transmitted to the radio base station device 10 from a radio terminal device 50 existing within the coverage of the radio base station device 10. The radio base station device 10 detects a sequence from a received RACH preamble signal by a sequence detecting unit 38. The radio relay station device 30 refers to a sequence stored in the preamble sequence storage unit 34 and judges whether or not the sequence detected from the RACH preamble signal is the sequence assigned to the radio base station device 10.

If the detected sequence is the sequence assigned to the radio base station device 10, a MAC control unit 36 of the radio relay station device 30 generates a reception notice comprising a random identifier corresponding to the sequence. A reception notice transmitting unit 40 of the radio relay station device 30 transmits the generated preamble reception notice to the radio base station device 10.

When the sequence of the received RACH preamble signal is not the sequence assigned to the radio base station device 10 or, in other words, when the sequence of the received RACH preamble signal is a sequence used at a cell managed by the radio relay station device 30, the radio relay station device 30 generates a RACH response signal by the MAC control unit 36. The radio relay station device 30 transmits the generated RACH response signal to the radio terminal device 50 via a response signal transmitting unit 42.

Next, operations of the radio base station device 10 having received a RACH preamble signal will be described. The radio base station device 10 receives a RACH preamble signal transmitted from the radio terminal device 50 by a preamble signal receiving unit 15. The radio base station device 10 detects a sequence from the RACH preamble signal by a sequence detecting unit 17, and obtains a random access identifier corresponding to the sequence. If the sequence is a sequence assigned to a cell of the radio base station, the radio base station device 10 generates a RACH response signal by a MAC control unit 14 and transmits the generated RACH response signal to the radio terminal device 50. However, instead of immediately transmitting the RACH response signal, the radio base station device 10 stands by to receive a reception notice relayed from the radio relay station device 30.

Figure 6:
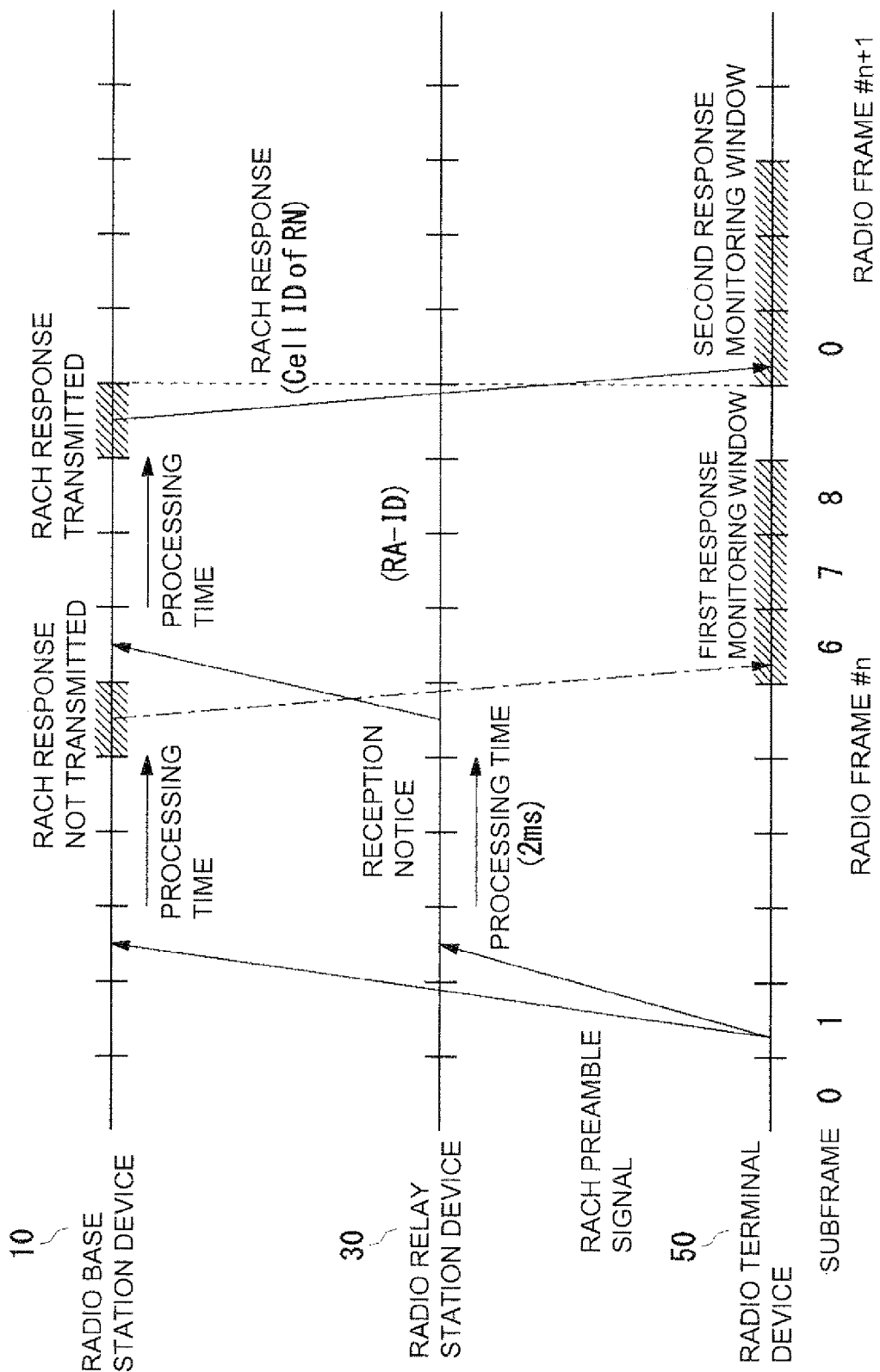
FIG. 6 is a diagram illustrating a passage of time between a reception of a RACH preamble signal and a transmission of a RACH response signal by the radio base station device.

FIG. 6 is a diagram illustrating a passage of time between a reception of a RACH preamble signal and a transmission of a RACH response signal by the radio base station device 10. FIG. 6 illustrates an example in which the radio base station device 10 directly receives a RACH preamble signal from the radio terminal device 50. Moreover, even when the radio base station device 10 is unable to directly receive a RACH preamble signal, if there is a preamble reception notice from the radio relay station device 30, the radio base station device 10 transmits a RACH response signal comprising a physical cell ID of the radio relay station device 30 to the radio terminal device 50 at a similar timing as the timing illustrated in FIG. 6.

As illustrated in FIG. 6, upon receiving a RACE preamble signal from the radio terminal device 50, the radio base station device 10 according to the present embodiment does not transmit a RACH response signal at a timing that is within a first response monitoring window of the radio terminal device 50. The radio base station device 10 awaits a reception notice that is likely to be transmitted from the radio relay station device 30. The radio base station device 10 transmits a RACH response signal at a timing that is receivable within a second response monitoring window of the radio terminal device 50.

Upon receiving a reception notice from the radio relay station device 30 within a prescribed period of time by a reception notice receiving unit 16, the radio base station device 10 obtains a random access identifier corresponding to a sequence detected from the RACH preamble signal directly received from the radio terminal device 50, and judges whether the obtained random access identifier and the random access identifier comprised in the reception notice match each other. If the random access identifiers match each other, the radio base station device 10 acknowledges that the radio terminal device 50 exists in the vicinity of a boundary between a coverage area of the radio base station device 10 and a coverage area of the radio relay station device 30 that is the transmission source of the reception notice.

In this case, the radio terminal device 50 may possibly perform a cell reselection to the radio relay station device 30. Even for communication between the radio terminal device 50 and the radio relay station device 30, continuous use of the sequence and the random access parameter that are used in the present RACH preamble signal is to be permitted.

When the radio base station device 10 receives reception notices from a plurality of radio relay station devices 30 and the random access identifiers comprised in the reception notices match the random access identifier detected from the RACH preamble signal, the radio base station device 10 may either permit the continuous use of the random access identifier to the plurality of radio relay station devices 30 or permit the continuous use of the random access identifier to a radio relay station device 30 selected from the plurality of radio relay station devices 30.

The radio base station device 10 notifies a sequence for which continuous use was permitted to the radio terminal device 50. Specifically, the radio base station device 10 generates, by the MAC control unit 14, a RACH response signal to which is added a physical cell ID of a cell managed by the radio relay station device 30 that is the transmission source of the reception notice. A response signal transmitting unit 18 of the radio base station device 10 transmits the generated RACH response signal to the radio terminal device 50. In addition to a physical cell ID, a RACH response signal comprises a random access identifier (RA-ID), an Uplink Grant for Message 3, a Tracking Alignment Value, an identifier for a temporary radio channel (Temporary-C-RNT1), and the like.

In order to notify permission to use the sequence to the radio relay station device 30 that is the transmission source of the reception notice, the radio base station device 10 generates a permission notice of a random access identifier corresponding to the sequence by the MAC control unit 14 and notifies the radio relay station device 30 via a permission notice transmitting unit 19.

While FIG. 4 illustrates an example in which a permission to use a sequence is notified by the transmission of a permission notice from the radio base station device 10 to the radio relay station device 30, the radio relay station device 30 may acquire information on the permission to use the sequence according to other methods.

Figure 7:
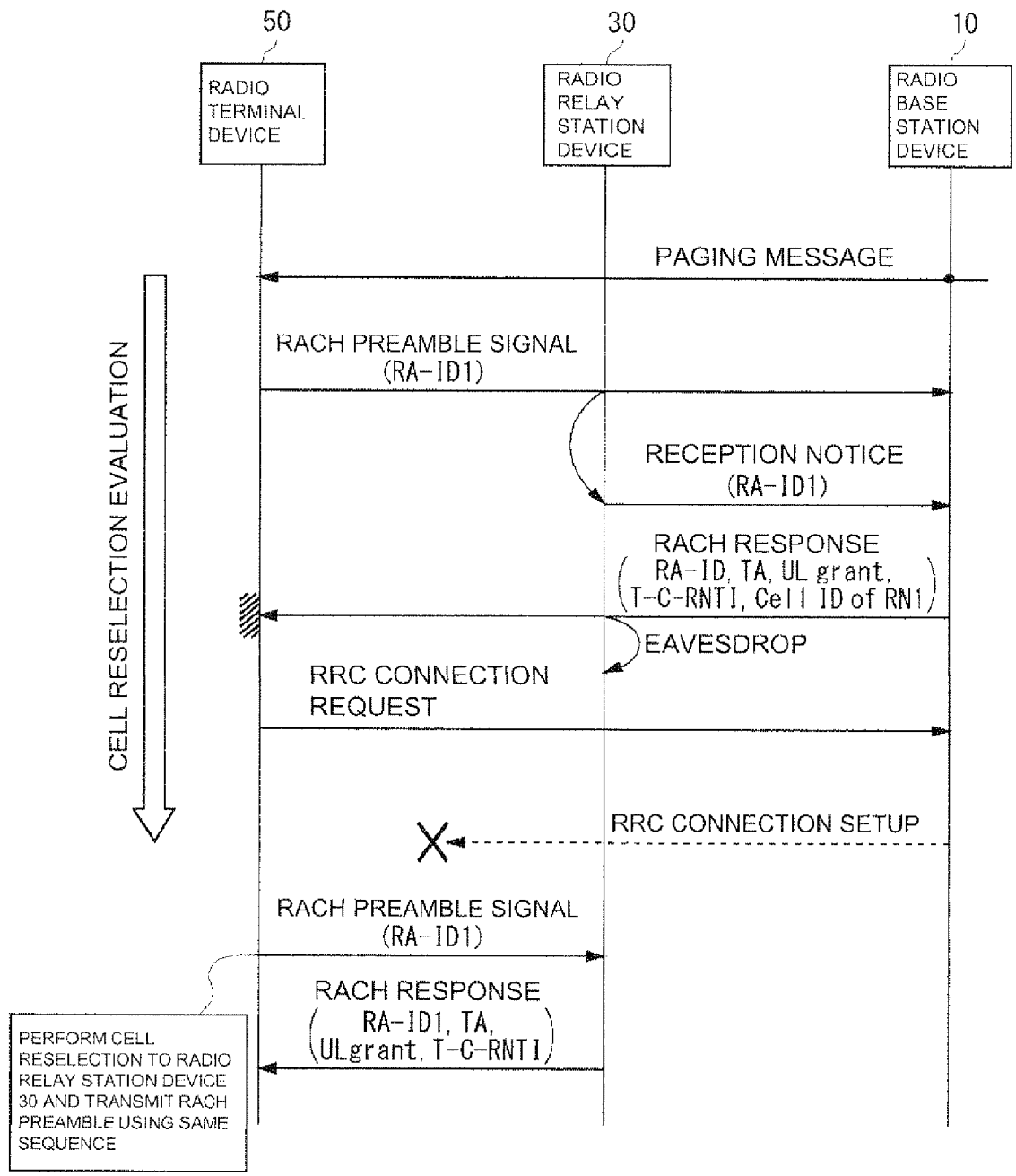
FIG. 7 is a diagram illustrating another example of the radio relay station device acquiring information concerning a permission to use a sequence.

As illustrated in FIG. 7, the radio relay station device 30 may eavesdrop on a RACH response signal sent from the radio base station device 10 to the radio terminal device 50. In this case, "eavesdrop" means that the radio relay station device 30 receives a signal not addressed to the radio relay station device 30. The radio relay station device 30 determines whether or not the random access identifier notified by the reception notice to the radio base station device 10 and the physical cell ID of a cell managed by the radio relay station device 30 are comprised in the RACH response signal to be transmitted to the radio terminal device 50. When the information in the reception notice is comprised, it is determined that the radio relay station device 30 has been permitted to use a random access sequence corresponding to the random access identifier. According to this method, signaling such as permission notification can be reduced.

Next, operations of the radio terminal device 50 having received a RACH response signal will be described. The radio terminal device 50 receives a RACH response signal comprising a random access identifier corresponding to the sequence of the transmitted RACH preamble signal within a predetermined reception interval (referred to as a "window"; refer to FIG. 6). Upon receiving the RACH response signal, the radio terminal device 50 detects contents of the RACH response signal by the MAC control unit 54.

The radio terminal device 50 uses radio resources allotted to the T-C-RNT1 and Uplink Grant of Message 3 comprised in the RACH response signal to generate an RRC connection request signal (Message 3) by the RRC control unit 53, and transmits the generated RRC connection request signal to the radio base station device 10. The RRC connection request signal supports error detection and retransmission based on Hybrid ARQ. Accordingly, the reception success rate of RRC connection request signals can be improved in eases where, for example, the radio terminal device 50 is at a cell edge.

Subsequently, the radio terminal device 50 awaits an RRC connection setup signal that is a response to the RRC connection request signal. When the radio base station device 10 is unable to correctly receive the RRC connection request signal even after a hybrid ARQ retransmission, the RACH preamble signal is retransmitted in order to reattempt the random access procedure. When the radio terminal device 50 is unable to receive an RRC connection setup signal even when retransmission of the RACH preamble signal is performed a prescribed number of times, the MAC control unit 54 of the radio terminal device 50 acknowledges that a random access failure has occurred and notifies the RRC control unit 53 of the random access failure.

Even after transmitting the RACH preamble signal, the radio terminal device 50 continues cell reselection evaluation necessary for cell reselection by a level detecting unit 59. Cell reselection evaluation is a process for evaluating a level variation of a received signal at a cell having been transmitting a RACH preamble signal or a cell adjacent thereto.

When a random access failure is acknowledged by the MAC control unit 54, the radio terminal device 50 searches for a cell with the best reception quality (hereinafter referred to as a "best cell") by a best cell searching unit 60 based on a received signal level variation of a cell detected by the level detecting unit 59. The radio terminal device 50 reselects a searched best cell.

After cell reselection, the radio terminal device 50 detects a physical cell ID of the reselected new cell by a synchronization signal detecting unit 58 upon transmitting a RACH preamble signal. The MAC control unit 54 of the radio terminal device 50 judges whether or not the detected physical cell ID is the same as the aforementioned physical cell ID notified by the RACH preamble signal. Accordingly, a judgment is made on whether or not the reselected new cell is a cell managed by the radio relay station device 30 permitted to use the random access identifier.

When the reselected cell is judged to be a cell managed by the radio relay station device 30 permitted to use the random access identifier, the MAC control unit 54 of the radio terminal device 50 generates a RACH preamble signal that uses (the random access identifier corresponding to) the sequence which had been used for the previous transmission of a RACH preamble signal to the radio base station device 10 and for which continuous use has been permitted by the radio base station device 10, and transmits the generated RACH preamble signal from a radio transmitting/receiving unit 51 to the radio relay station device 30.

When the physical cell ID of the best cell differs from the physical cell ID comprised in the RACH response signal, the radio terminal device 50 performs the same process as a conventional random access procedure. In other words, the radio terminal device 50 receives system information on the new cell, detects a random access parameter used in the new cell by the RRC control unit 53, generates a RACH preamble signal using the detected random access parameter, and transmits the generated RACH preamble signal.

The radio relay station device 30 having received the RACH preamble signal detects a sequence with the sequence detecting unit 38. Subsequently, the radio relay station device 30 judges, by a random access identifier judging unit 39, whether or not the random access identifier corresponding to the sequence is the random access identifier for which use has been permitted by the radio base station device 10. If the random access identifier corresponding to the sequence is the random access identifier for which use has been permitted by the radio base station device 10, the radio relay station device 30 generates a RACH response signal with the MAC control unit 36 and transmits the RACH response signal to the radio terminal device 50 in the same manner as a sequence assigned to a cell of the radio relay station device 30.

As described above, in the first embodiment, when receiving a reception notice from the radio relay station device 30, the radio base station device 10 transmits a RACH response signal comprising a physical cell ID of a cell managed by the radio relay station device 30 from which the reception notice had been received, notifies permission of continuous use of a relevant sequence by the radio terminal device 50 in the cell managed by the radio relay station device 30, and notifies the permission to use the sequence to the radio relay station device 30. Accordingly, even when a cell reselection is performed during a random access procedure from a cell managed by the radio base station device 10 to a cell managed by the radio relay station device 30 connected to the radio base station device 10 via a radio channel, a random access parameter can be continuously used at the new cell. Therefore, there is no need to read system information and a RACH preamble signal can be promptly transmitted in the new cell. In addition, since the radio relay station device 30 having been permitted use transmits a RACH response signal, an effect of reducing latency upon establishing a connection can be achieved.

Second Embodiment

Figure 8:
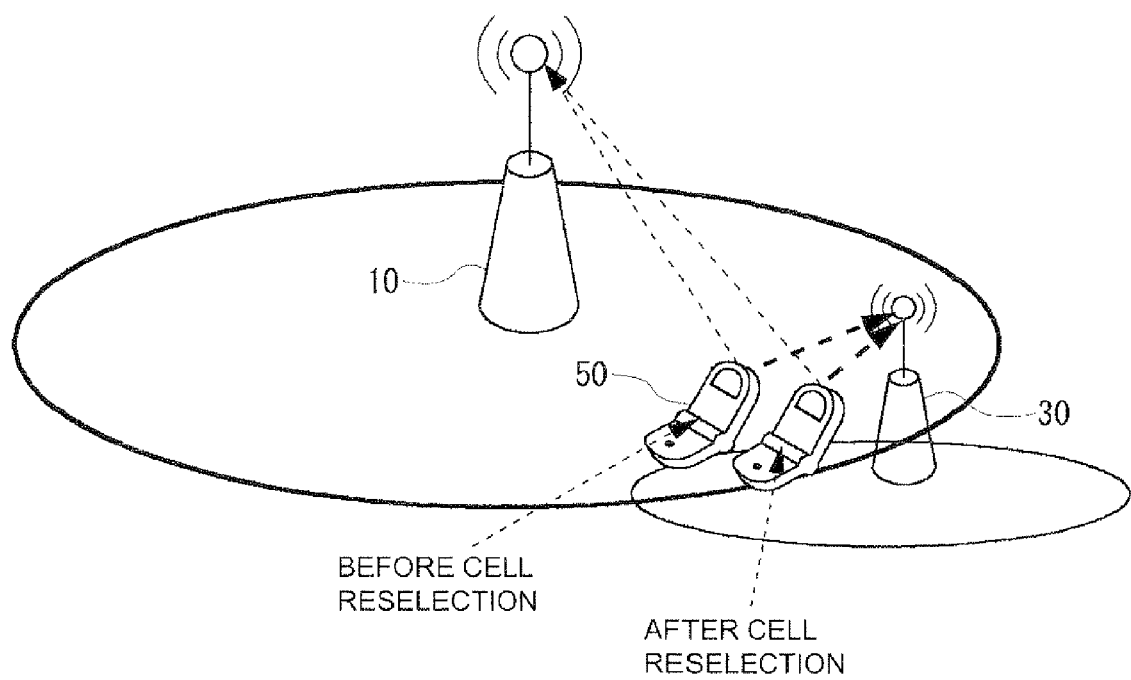
FIG. 8 is a diagram illustrating a transmission range of a RACH preamble signal of the radio base station device.

Next, a second embodiment of the present invention will be described in detail with reference to the drawings. In the first embodiment, a permission to use a sequence of a random access is granted. However, when a radio terminal device 50 having been permitted continuous use of the sequence performs a cell reselection and transmits a RACH preamble signal in a new cell, as illustrated in FIG. 8, it is possible that the radio base station device 10 may also receive the RACH preamble signal in addition to a radio relay station device 30 that manages the new cell.

Figure 9:
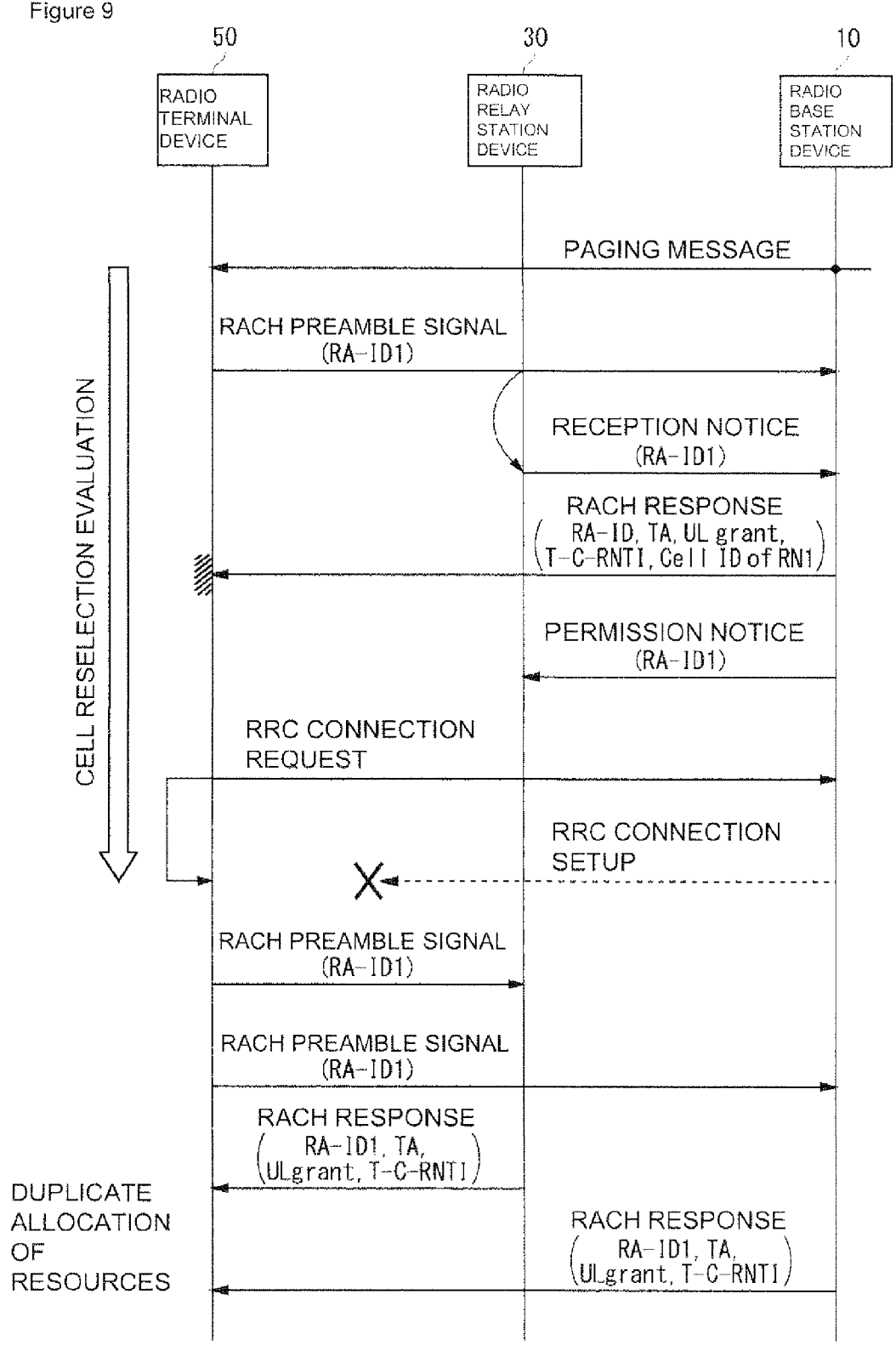
FIG. 9 is a diagram illustrating a background of a second embodiment.

A background of the second embodiment will now be described with reference to FIG. 9. A case will be considered where, after an RRC connection request to the radio base station device 10 fails, a radio terminal device 50 selects a cell managed by a radio relay station device 30 through cell reselection and transmits a RACH preamble signal to the selected radio relay station device 30. When the radio base station device 10 receives the RACH preamble signal, there is a possibility that the radio base station device 10 recognizes the radio terminal device 50 having transmitted the RACH preamble signal as another radio terminal device 50 that has newly notified an access request. In this case, the radio base station device 10 ends up transmitting a RACH response signal and, at the same time, inadvertently allocating a resource for an RRC setup request signal. Since the radio relay station device 30 also transmits a RACH response signal and allocates a resource for an RRC setup request signal, duplicate resource allocations are performed, resulting in a waste of radio resources.

The second embodiment prevents such duplicate allocations of radio resources. A wireless communication system according to the second embodiment is basically configured the same as the wireless communication system according to the first embodiment (refer to FIGS. 1 to 3). The radio base station device 10 judges whether or not the radio terminal device 50 that is the transmission source of the RACH preamble signal is connected to the radio relay station device 30 which had been granted permission to use the sequence. The radio base station device 10 is equipped with a function for judging, based on the judgment result, whether or not transmission of a RACH response signal is necessary.

Figure 10:
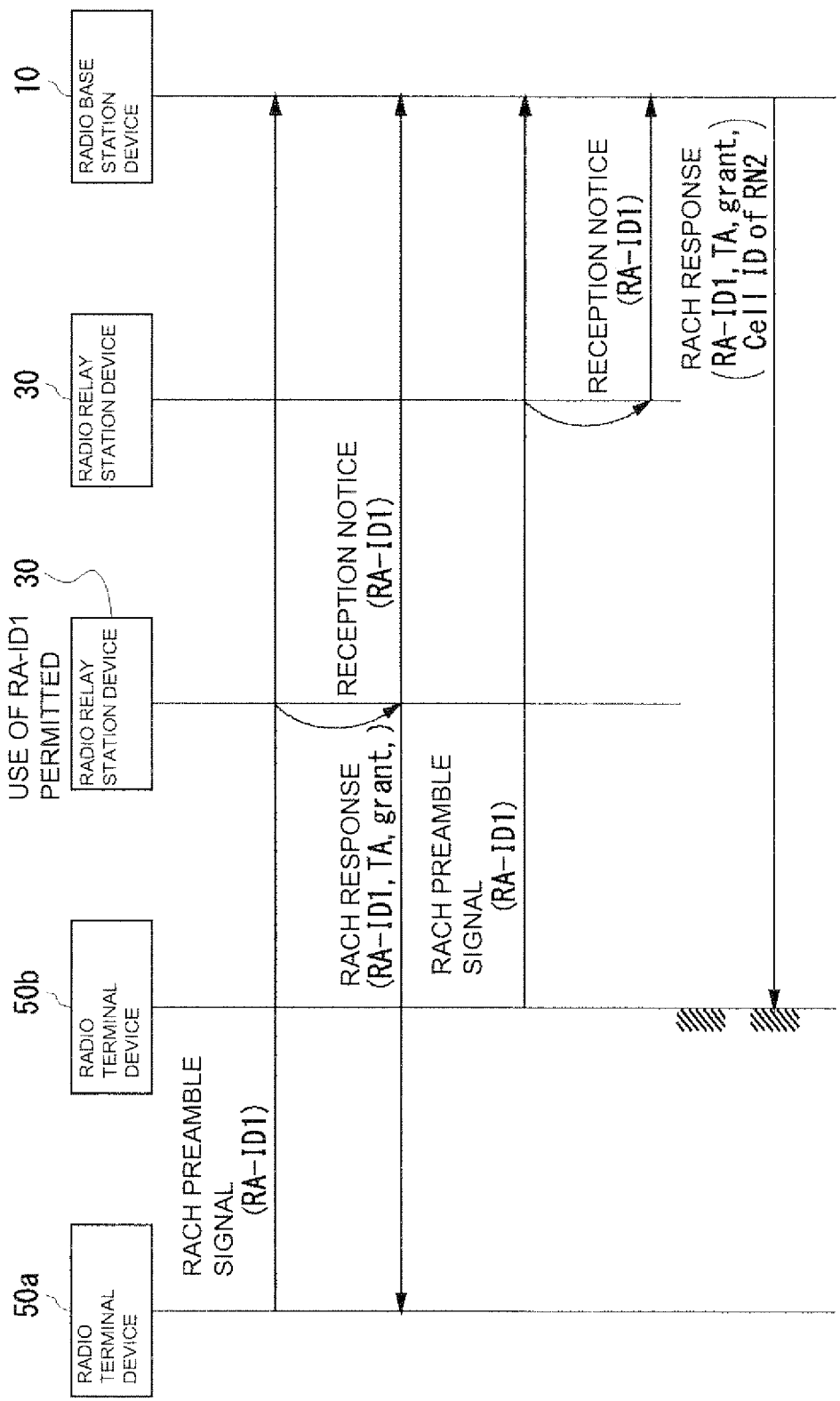
FIG. 10 is a sequence diagram illustrating a random access procedure according to the second embodiment.

FIG. 10 is a sequence diagram illustrating a random access procedure according to the second embodiment. The radio relay station device 30 having granted permission by the radio base station device 10 to use a sequence generates, upon receiving a RACH preamble signal comprising the sequence from a radio terminal device 50a, a RACH response signal by a MAC control unit 36, and transmits the RACH response signal to the radio terminal device 50a. The radio relay station device 30 generates a reception notice of the RACH preamble signal and transmits the reception notice to the radio base station device 10.

Upon receiving the reception notice, the radio base station device 10 reads the contents of the reception notice by a MAC control unit 14. The radio base station device 10 judges whether or not a random access identifier read from the reception notice matches a random access identifier corresponding to the sequence used in the RACH preamble signal received from the radio terminal device 50a in order to judge whether or not the received RACH preamble signal comprises the sequence which the radio relay station device 30 had been permitted to use.

When the random access identifiers match each other, a determination is made on whether or not the radio relay station device 30 that is the transmission source of the reception notice is the radio relay station device 30 permitted to use the sequence. When the transmission source of the reception notice is the radio relay station device 30 permitted to use the sequence, the radio base station device 10 does not transmit a RACH response signal.

When a radio relay station device 30 not granted permission by the radio base station device 10 to use the sequence receives a RACH preamble signal comprising the sequence from a radio terminal device 50b, the radio relay station device 30 transmits a reception notice to the radio base station device 10. In this case, the radio base station device 10 determines that the transmission source of the reception notice is not the radio relay station device 30 permitted to use the sequence, and transmits a RACH response signal in the same manner as in the first embodiment. In other words, the radio base station device 10 generates a RACH response signal to which is added a physical cell ID of a cell managed by the radio relay station device 30 that is the transmission source of the reception notice, and transmits the RACH response signal from a radio transmitting/receiving unit 11 to the radio terminal device 50b. In addition to a physical cell ID, the RACH response signal comprises a random access identifier (RA-ID), an Uplink Grant for Message 3, a Tracking Alignment Value, a Temporary-C-RNT1, and the like.

As described above, in the second embodiment of the present invention, the radio relay station device 30 having granted permission to use a sequence by the radio base station device 10 generates a RACH response signal by the MAC control unit 36 upon receiving a RACH preamble signal comprising the sequence, transmits the RACH response signal to the radio terminal device 50a, and transmits a reception notice of the RACH preamble signal to the radio base station device 10. The radio base station device 10 having received the reception notice can determine whether or not the radio terminal device 50a that is the transmission source of the RACH preamble signal is connected to the radio relay station device 30 permitted to use the sequence in order to determine whether or not transmission of a RACH response signal is necessary. Accordingly, waste of radio resources due to duplicate resource allocations can be prevented.

Third Embodiment

Figure 11:
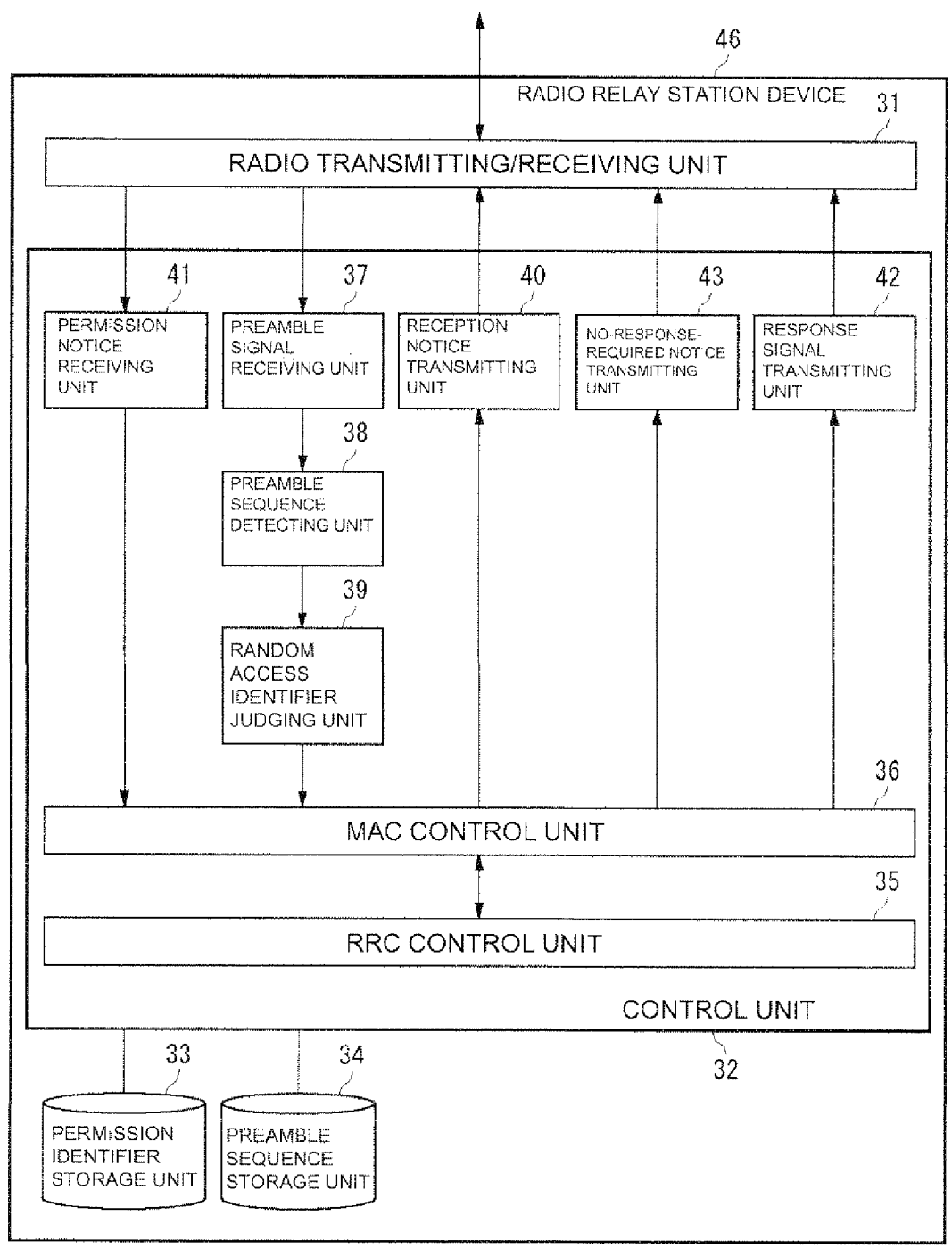
FIG. 11 is a diagram illustrating a configuration of a radio relay station device according to a third embodiment.

Next, a wireless communication system according to a third embodiment of the present invention will be described. The wireless communication system according to the third embodiment is basically configured the same as the wireless communication system according to the first embodiment. As illustrated in FIG. 11, in the wireless communication system according to the third embodiment, a radio relay station device 30 further comprises a no-response-required notice transmitting unit 43 that transmits a no-random access response-required notice (No-RACH Response Notice) to a radio base station device 10.

Figure 12:
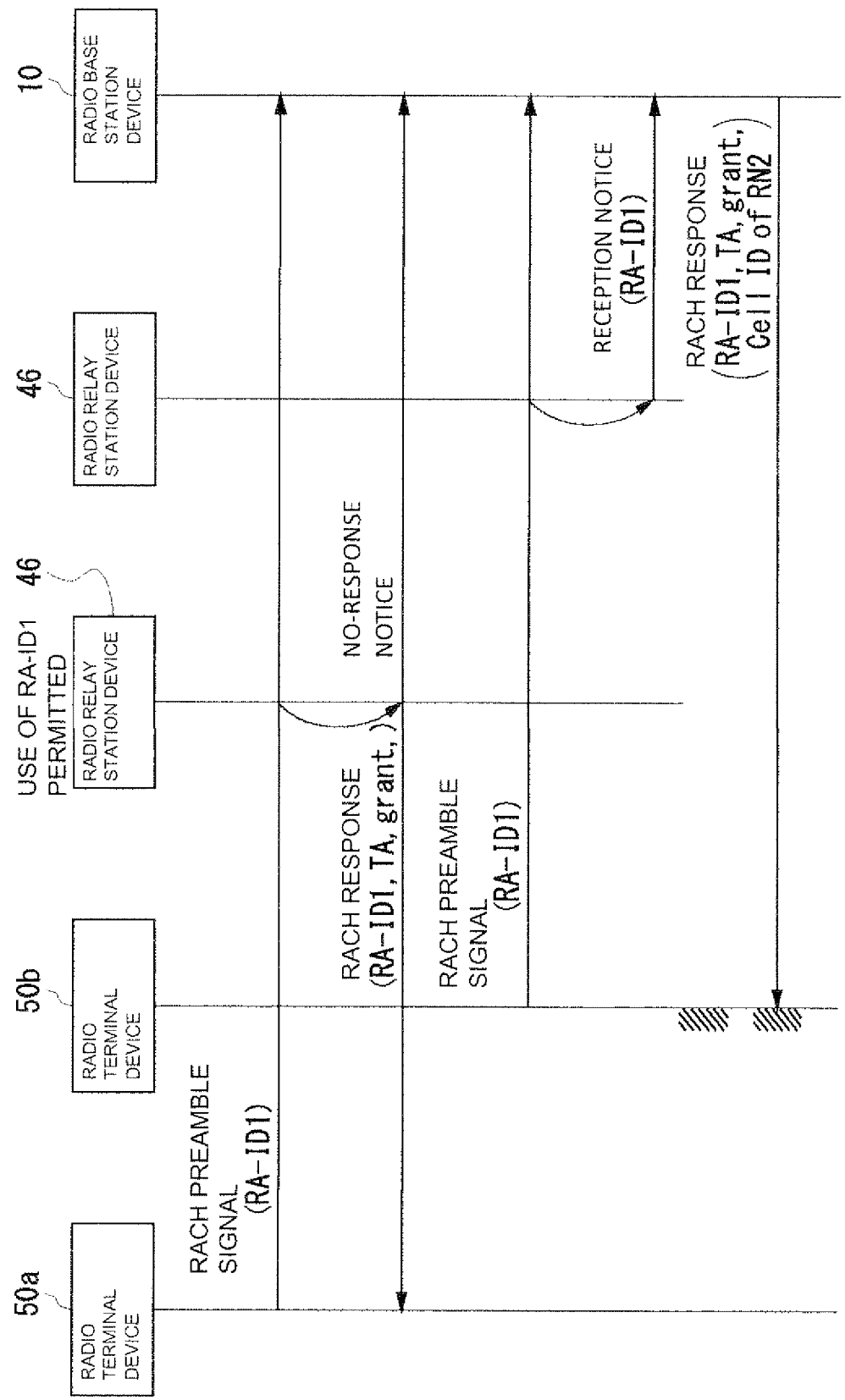
FIG. 12 is a sequence diagram illustrating a random access procedure according to the third embodiment.

FIG. 12 is a sequence diagram illustrating a random access procedure according to the third embodiment of the present invention. In the second embodiment, a radio relay station device 30 having granted permission by the radio base station device 10 to use a sequence generates a RACH response signal by a MAC control unit 36 upon receiving a RACH preamble signal comprising the sequence, and transmits the RACH response signal to a radio terminal device 50. In the second embodiment, the radio relay station device 30 generates a reception notice comprising a random access identifier and transmits the reception notice to the radio base station device 10. However, in the third embodiment, instead of the reception notice, the radio relay station device 30 transmits from the no-response-required notice transmitting unit 43 to the radio base station device 10 a no-random access response-required notice (No RACH Response Notice; hereinafter referred to as a "no-response notice") that notifies that transmission of a RACH response signal is not required.

When the radio base station device 10 receives a no-response notice within a prescribed period of time after receiving the RACH preamble signal, the radio base station device 10 does not transmit a RACH response signal corresponding to the RACH preamble signal.

When the radio base station device 10 receives a reception notice within a prescribed period of time as in the case of processing performed on a radio terminal device 50b illustrated in FIG. 12, in the same manner as in the first embodiment, the radio base station device 10 generates a RACH response signal to which is added a physical cell ID of a cell managed by the radio relay station device 30 that is the transmission source of the reception notice by a MAC control unit 14, and transmits the RACH response signal from a response signal transmitting unit 18 to the radio terminal device 50b. In addition to a physical cell ID, the RACH response signal comprises a random access identifier (RA-ID), an Uplink Grant for Message 3, a Tracking Alignment Value, a Temporary-C-RNT1, and the like.

As described above, in the third embodiment of the present invention, the radio relay station device 30 having granted permission to use a sequence by the radio base station device 10 generates a no-response notice by the MAC control unit 36 upon receiving a RACH preamble signal comprising the sequence, and transmits the generated no-response notice from the no-response-required notice transmitting unit 43 to the radio terminal device 50. Accordingly, the radio base station device 10 can be notified that transmission of a RACH response signal is not required, and an effect of preventing duplicate resource allocation by the radio base station device 10 and avoiding waste of radio resources can be achieved.

Fourth Embodiment

Figure 13:
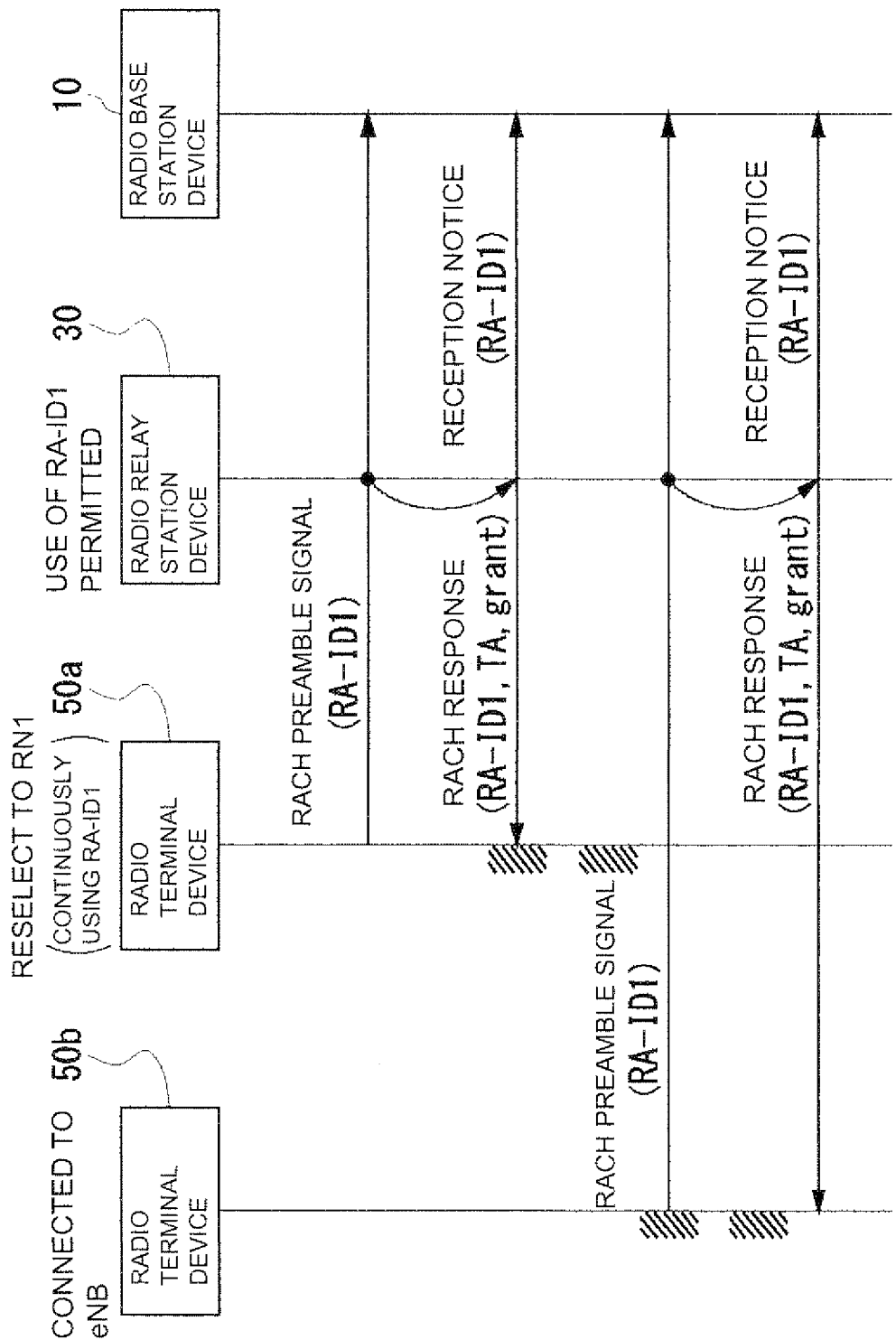
FIG. 13 is a diagram illustrating an example where another radio terminal device connected to a radio base station device transmits a RACH preamble signal.

Next, a fourth embodiment of the present invention will be described in detail with reference to the drawings. FIG. 13 is a diagram illustrating an example where a radio terminal device 50b exists within the coverage of a radio base station device 10 and is connected to the radio base station device 10, and the radio terminal device 50b transmits a RACH preamble signal. When the radio terminal device 50b that differs from a radio terminal device 50a that has been granted permission for continuous use of a sequence transmits a RACH preamble signal, a RACH response signal may conceivably be not transmitted from the radio base station device 10 to the radio terminal device 50b. If a sequence in the RACH preamble signal transmitted by the radio terminal device 50b coincidentally matches the sequence which a radio relay station device 30 has been permitted to use, the radio base station device 10 does not transmit a RACH response signal because the radio relay station device 30 transmits a RACH response signal.

The RACH response signal to be transmitted by the radio relay station device 30 has been subjected to cell-specific scrambling. Since the radio terminal device 50b connected to the radio base station device 10 uses a code that differs from a code used by the radio relay station device 30, the radio terminal device 50b is unable to descramble the scrambling. Therefore, in rare cases where a RACH preamble signal is transmitted while using, by chance, a sequence for which permission to use has been granted, a RACH response signal may not be received, thereby preventing an RRC connection setup from being completed. The fourth embodiment solves the problem described above by controlling a transmission power of a RACH preamble signal and by controlling a time window in which a RACH response signal is to be received.

Figure 14:
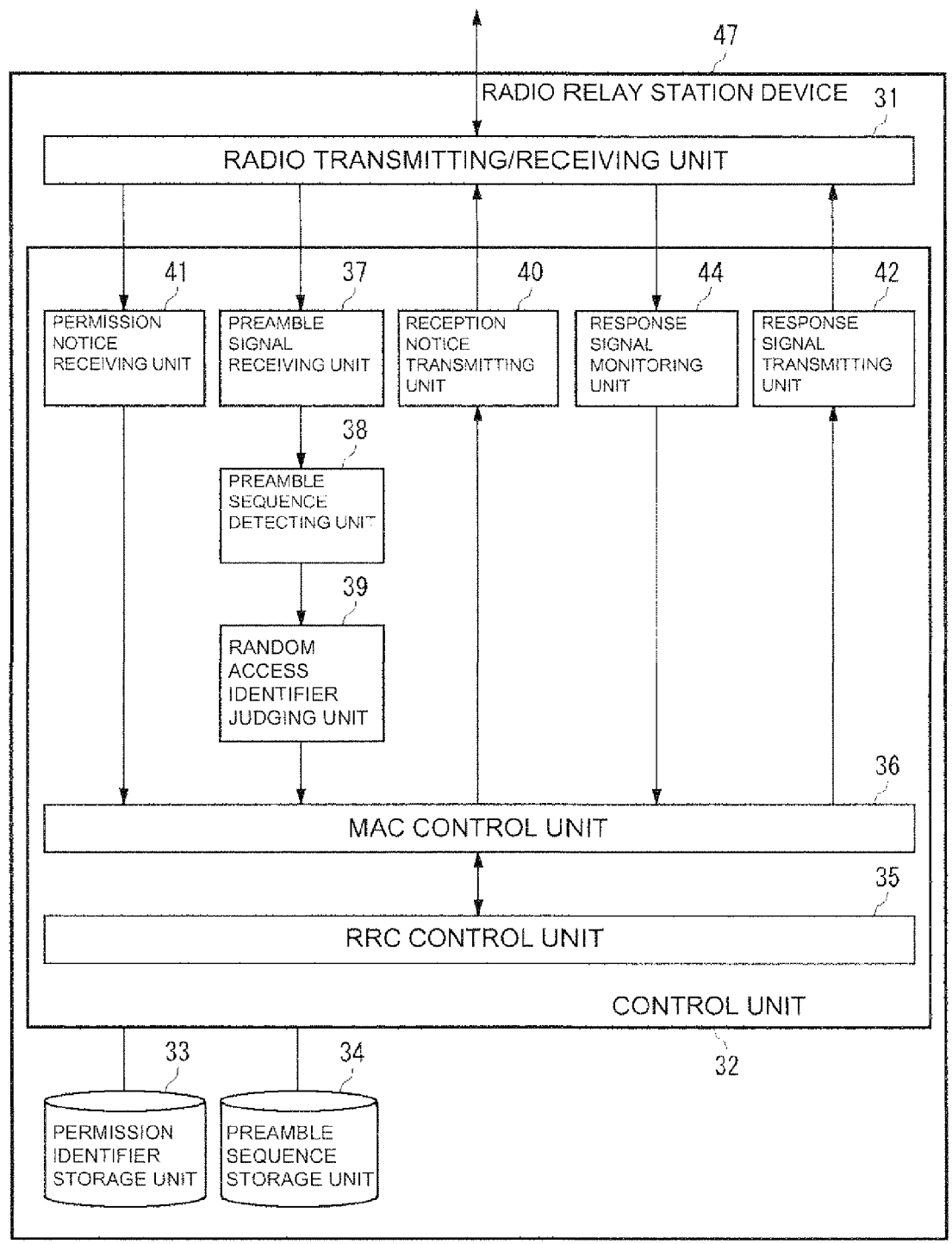
FIG. 14 is a diagram illustrating a configuration of a radio relay station device according to a fourth embodiment.

A wireless communication system according to the fourth embodiment of the present invention is basically configured the same as the wireless communication system according to the first embodiment. As illustrated in FIG. 14, in the fourth embodiment, a radio relay station device 47 comprises a response signal monitoring unit 44 that monitors a RACH response signal transmitted from the radio base station device 10 to a radio terminal device 50.

Figure 15:
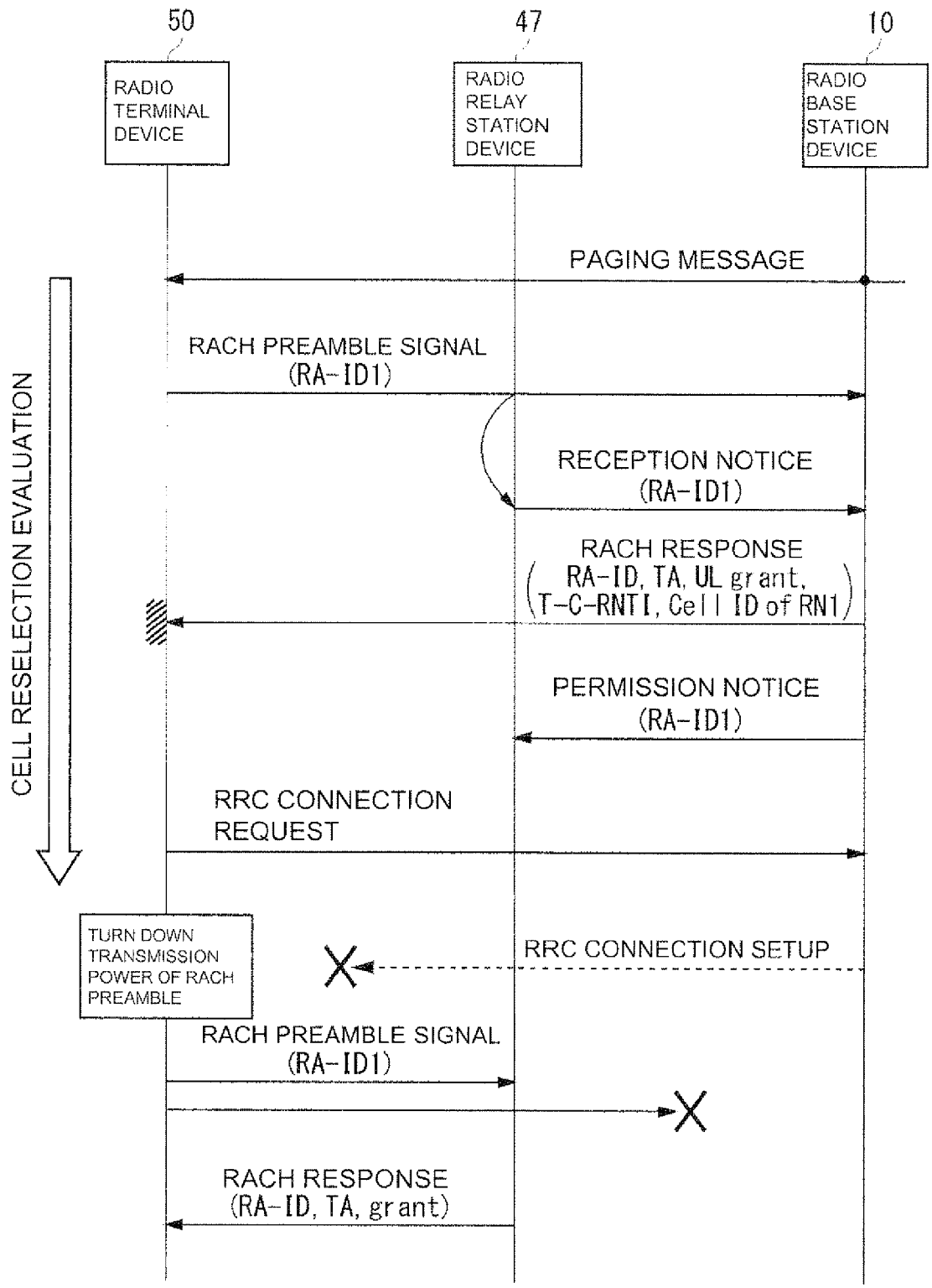
FIG. 15 is a sequence diagram illustrating a random access procedure according to the fourth embodiment.

FIG. 15 is a sequence diagram illustrating a random access procedure according to the fourth embodiment of the present invention. The radio base station device 10 receives a reception notice from the radio relay station device 47 within a prescribed period of time, and judges whether or not a random access identifier comprised in the reception notice matches a random access identifier corresponding to a preamble sequence detected from a received RACH preamble signal. When the random access identifiers are judged to match each other, in the same manner as in the first embodiment, a physical cell ID of a cell managed by the radio relay station device 47 that is a transmission source of the preamble reception notice is added to a RACH response signal.

In the present embodiment, the radio base station device 10 adds, to a RACH response signal, parameters that control a transmission power of a RACH preamble signal to be transmitted upon cell reselection, and transmits the RACH response signal to the radio terminal device 50. Specifically, the control parameters comprise a reference value P0 of the transmission power of a RACH preamble signal prescribed by the radio relay station device 47 that has been granted permission for continuous use, and a transmission power (RSTP or Reference Symbol Transmission Power) of a pilot signal (or a reference signal) which is to be transmitted from the radio relay station device 47 and which is necessary for calculating a path loss between the radio terminal device 50 and the radio relay station device 47. In this regard, it is assumed that the radio base station device 10 has prior knowledge of the values of the aforementioned parameters which have been set by the radio relay station device 47 that serves under the radio base station device 10.

After cell reselection to the radio relay station device 47, the radio terminal device 50 controls the transmission power of the RACH preamble signal by using the notified control parameters so that the RACH preamble signal can be received by the radio relay station device 47 but not by the radio base station device 10.

Next, a description will be given on the prevention of allocation of duplicate radio resources by controlling the radio base station device 10 and the radio relay station device 47 so that RACH response signals are not transmitted to the same radio terminal device 50 from the radio base station device 10 and the radio relay station device 47.

Figure 16:
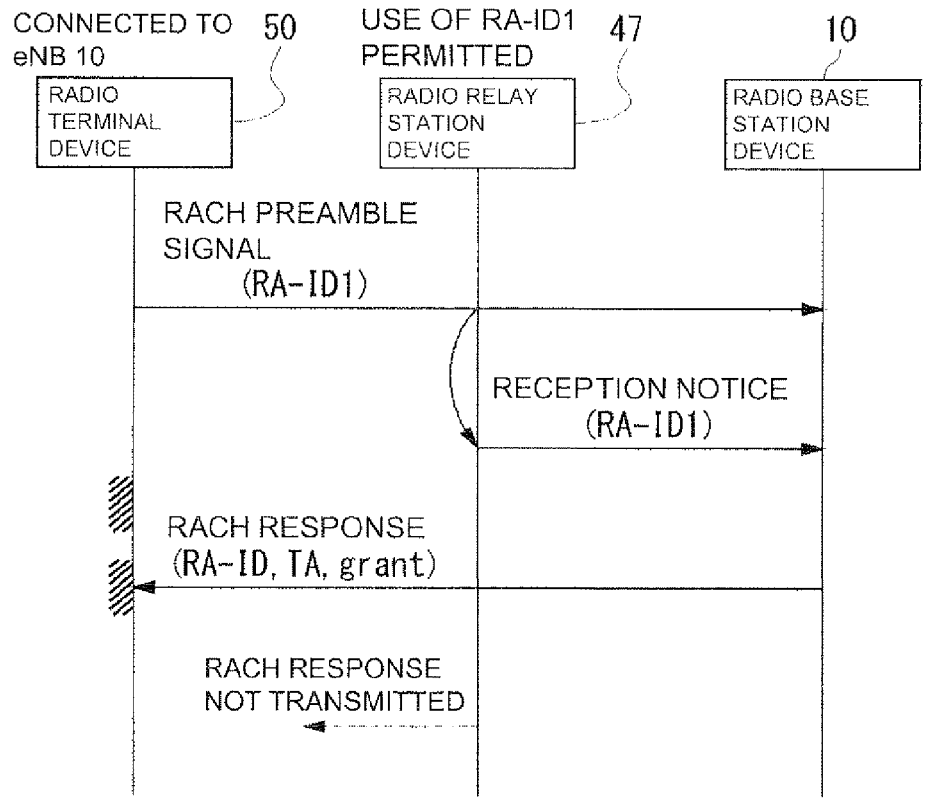
FIG. 16 is a diagram illustrating a RACH response signal transmission method of a radio base station device and a radio relay station device.
Figure 17:
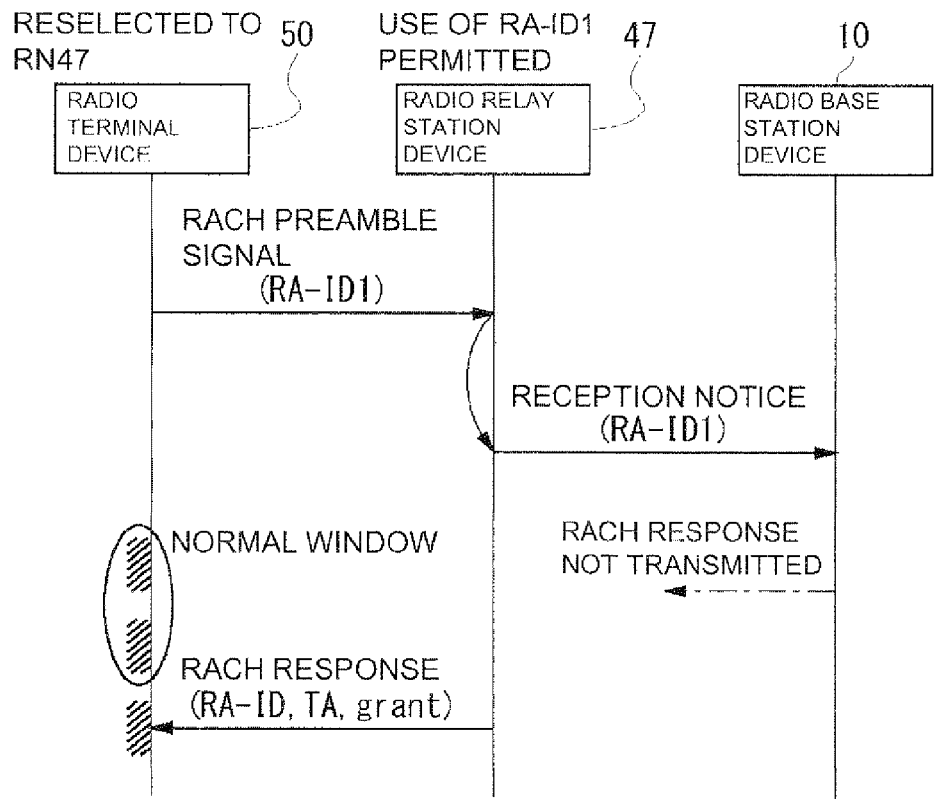
FIG. 17 is a diagram illustrating a RACH response signal transmission method of a radio base station device and a radio relay station device.

FIGS. 16 and 17 are diagrams illustrating RACH response signal transmission methods of the radio base station device 10 and the radio relay station device 47. FIG. 16 is a diagram illustrating an example of a case where a RACH preamble signal is received by the radio relay station device 47 and the radio base station device 10. FIG. 17 is a diagram illustrating an example of a case where, due to transmission power control on the RACH preamble signal, the RACH preamble signal is only received by the radio relay station device 47.

As illustrated in FIG. 16, the radio base station device 10 transmits a RACH response signal in response to a RACH preamble signal transmitted from the radio terminal device 50 connected to the radio base station device 10 by a same operation as in the first embodiment. The radio relay station device 47 having received the RACH preamble signal comprising the sequence for which permission to use has been granted monitors, using a response signal monitoring unit 44, whether or not a RACH response signal is to be transmitted from the radio base station device 10 instead of immediately transmitting a RACH response signal to the radio terminal device 50.

Specifically, the response signal monitoring unit 44 eavesdrops on a RACH response signal transmitted from the radio base station device 10, and determines whether or not the RACH response signal comprises a random access identifier corresponding to the physical cell ID of the radio relay station device 47 itself and to a sequence for which permission to use has been granted. When a random access identifier corresponding to the sequence for which permission to use has been granted is comprised, the radio relay station device 47 does not transmit a RACH response signal. If eavesdropping is not performed on the RACH preamble signal comprising a random access identifier corresponding to the sequence for which permission to use has been granted within a prescribed time window, as illustrated in FIG. 17, the radio relay station device 47 transmits a RACH response signal to the radio terminal device 50.

Figure 18:
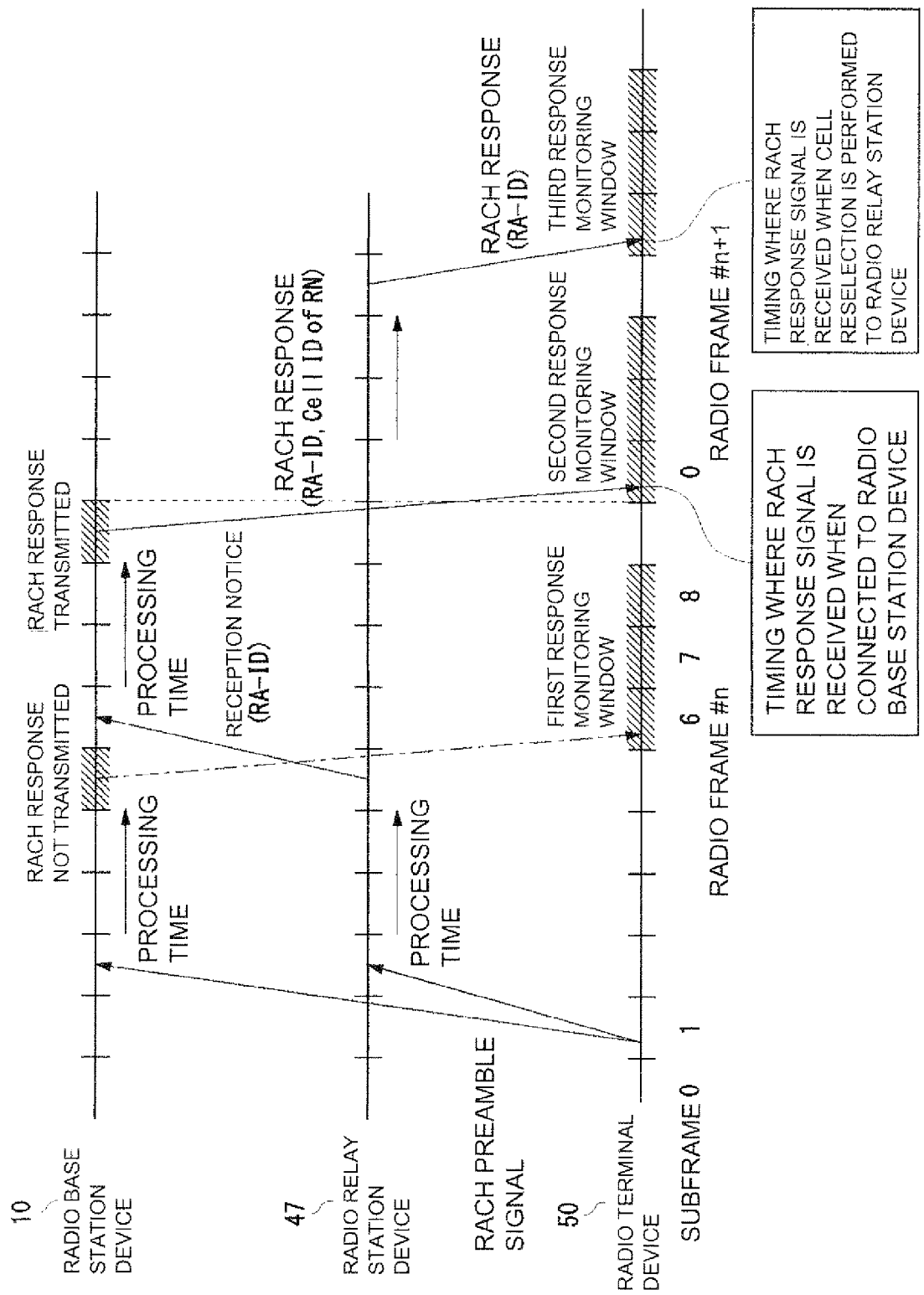
FIG. 18 is a diagram illustrating a reception time window of a RACH response signal of a radio terminal device.

FIG. 18 is a diagram illustrating a reception time window of a RACH response signal of the radio terminal device 50 corresponding to the aforementioned transmission method and transmission timing of a RACH response signal of the radio base station device 10 and the radio relay station device 47. As illustrated in FIG. 18, when the radio terminal device 50 that has been permitted continuous use performs a cell reselection to the radio relay station device 47 that has been permitted continuous use and then transmits a RACH preamble signal, a RACH response signal is to be received within a third time window.

As described above, in the fourth embodiment of the present invention, the radio terminal device 50 that has been permitted continuous use of a sequence performs cell reselection to the radio relay station device 47 to which continuous use of a random access identifier has been permitted, and using transmission power control parameters notified in advance by a RACH response signal, subsequently appropriately sets a transmission power of a RACH preamble signal so that the RACH preamble signal is only received by the radio relay station device 47. In addition, the radio relay station device 47 that has been permitted use of the sequence determines whether a RACH response signal is to be transmitted after verifying whether or not a RACH preamble signal is to be transmitted from the radio base station device 10. Accordingly, even in rare cases where a radio terminal device 50 that differs from the radio terminal device 50 that has been permitted continuous use of the sequence transmits a RACH preamble signal while using, by chance, a sequence for which permission to use has been granted, a RACH response signal is transmitted from the radio base station device 10 to the different radio terminal device 50. Therefore, the sequence can be appropriately executed.

Fifth Embodiment

Next, a wireless communication system according to a fifth embodiment of the present invention will be described. The wireless communication system according to the fifth embodiment is basically configured the same as the wireless communication system according to the fourth embodiment. In the wireless communication system according to the fifth embodiment, as illustrated in FIG. 19, a radio relay station device 30 comprises a reception level detecting unit 45 that detects a reception level of a RACH preamble signal received by a preamble signal receiving unit 37.

Figure 20:
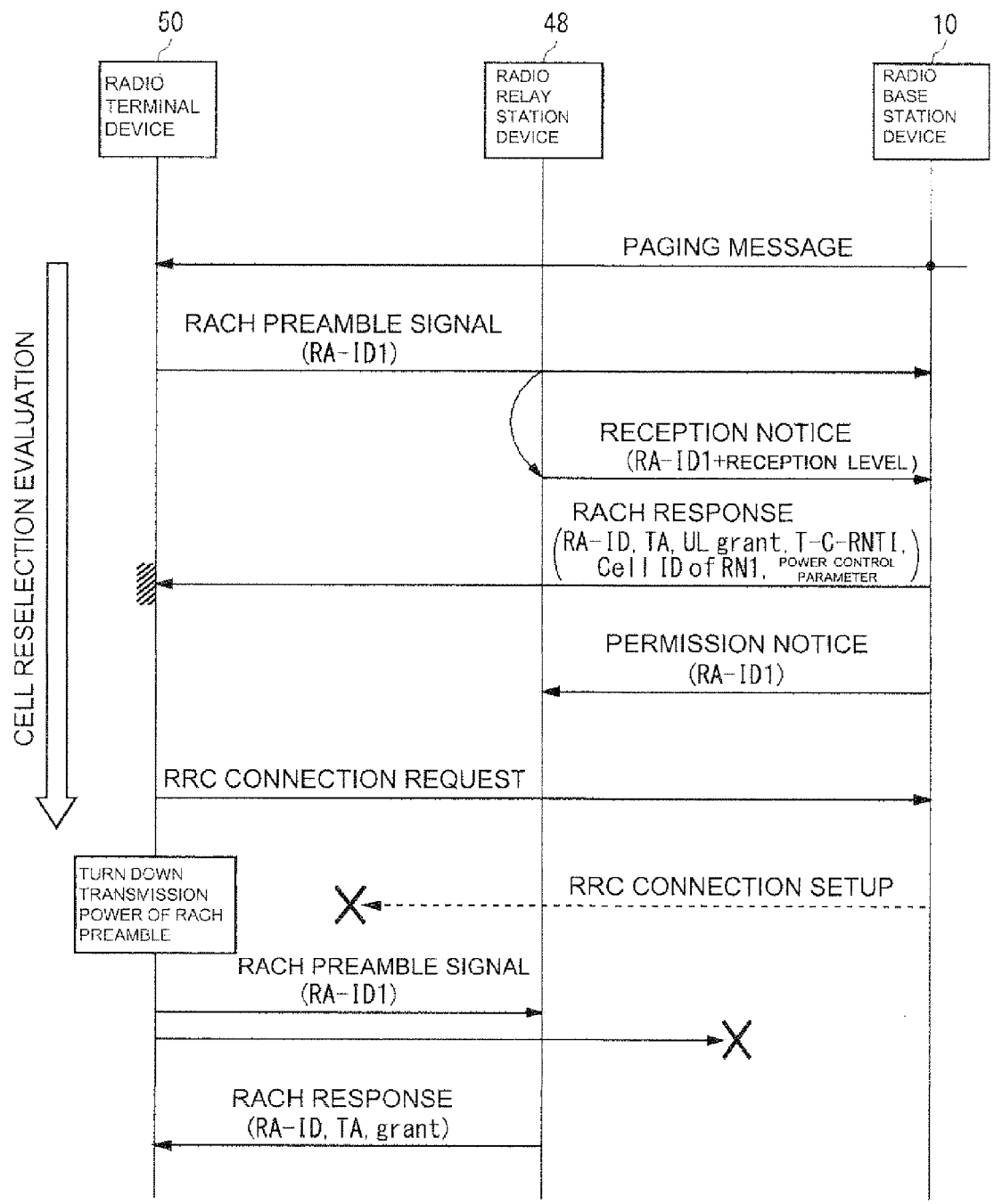
FIG. 20 is a sequence diagram illustrating a random access procedure according to the fifth embodiment.

FIG. 20 is a sequence diagram illustrating a random access procedure according to the fifth embodiment of the present invention. In the fourth embodiment, in order to control a transmission power of a RACH preamble signal to be transmitted by a radio terminal device 50, a radio base station device 10 adds, to a RACH response signal, a reference value P0 of a transmission power of a RACH preamble signal and a transmission power RSTP of a pilot signal (or a reference signal) to be transmitted from a radio relay station device 48. In the fifth embodiment, the radio terminal device 50 controls a transmission power of a RACH preamble signal based on a reception power level of a RACH preamble signal received by the radio relay station device 48.

Figure 19:
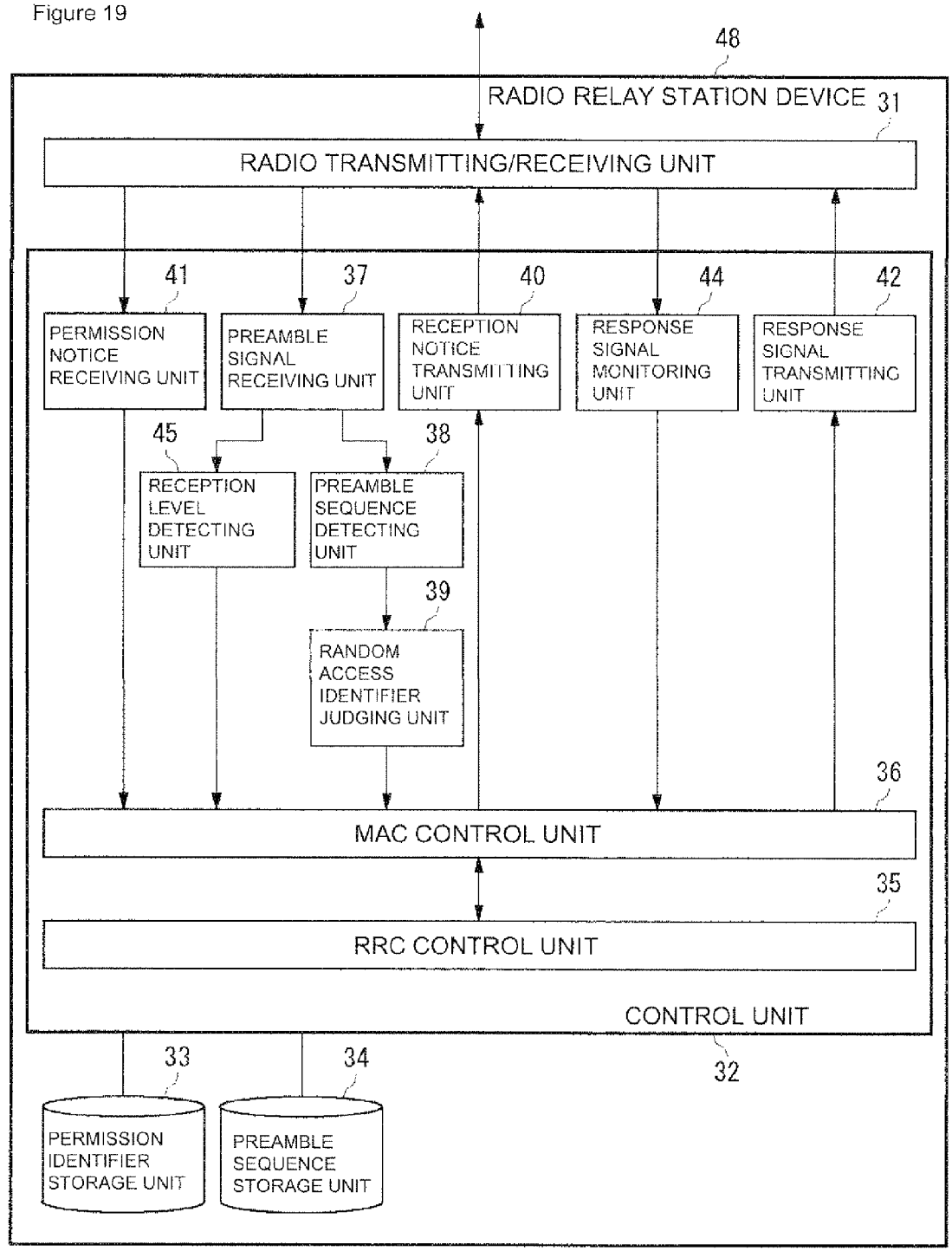
FIG. 19 is a diagram illustrating a configuration of a radio relay station device according to a fifth embodiment.

Specifically, as illustrated in FIG. 20, upon receiving a RACH preamble signal comprising a sequence used by the radio base station device 10 to which the radio relay station device 48 is connected, the radio relay station device 48 detects a reception level of the RACH preamble signal by a reception level detecting unit 45 illustrated in FIG. 19, generates a reception notice comprising the detected reception level by a MAC control unit 36, and transmits the reception notice to the radio base station device 10.

Upon receiving the reception notice, the radio base station device 10 calculates, at a MAC control unit 14, a control parameter for controlling a transmission power of the RACH preamble signal based on the RACH preamble reception level notified by the reception notice and a reception characteristic of the radio relay station device 48 or in other words, a level at which the radio relay station device 48 is able to favorably receive the RACH preamble signal. The control parameter is to be used when the radio terminal device 50 performs a cell reselection to the radio relay station device 48 for which continuous use of a sequence has been permitted. Specifically, if A [dB] denotes the notified reception level and B [dB] denotes the level at which the radio relay station device 48 is able to favorably receive the RACH preamble signal, then the power control parameter can be expressed as A−B [dB]. The radio base station device 10 adds the calculated control parameter to a RACH response signal and transmits the RACH response signal to the radio terminal device 50. Moreover, the power control parameter may alternatively be calculated by the radio relay station device 48, in which case the power control parameter is to be added to a reception notice.

As described above, in the fifth embodiment of the present invention, in a similar manner to the fourth embodiment, the radio terminal device 50 that has been permitted continuous use of a sequence performs cell reselection to a radio relay station device 48 that has been permitted use, and using a transmission power control parameter notified by a RACH response signal, subsequently sets a transmission power of a RACH preamble signal so that the RACH preamble signal only reaches the radio relay station device 48. In addition, the radio relay station device 48 that has been permitted use of the sequence determines whether or not a RACH response signal is to be transmitted after verifying whether or not a RACH response signal is to be transmitted from the radio base station device 10. Accordingly, even in a case where a radio terminal device 50 that differs from the radio terminal device 50 that has been permitted continuous use of the sequence transmits a RACH preamble signal using the sequence for which permission to use has been granted, a RACH response signal is transmitted from the radio base station device 10 to the different radio terminal device 50.

Sixth Embodiment

Figure 21:
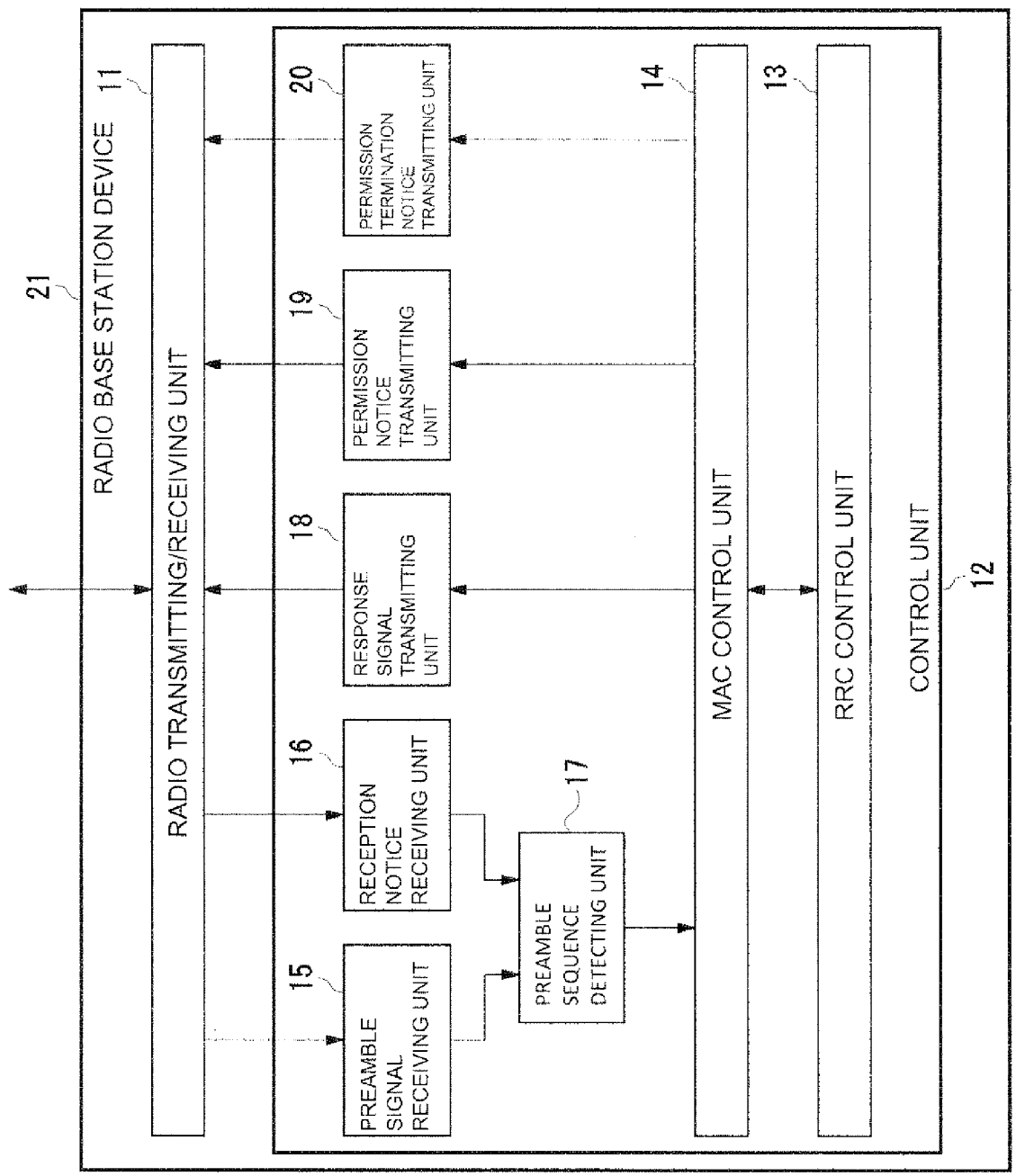
FIG. 21 is a diagram illustrating a configuration of a radio base station device according to a sixth embodiment.

Next, a wireless communication system according to a sixth embodiment of the present invention will be described. The wireless communication system according to the sixth embodiment is basically configured the same as the wireless communication system according to the first embodiment, in the wireless communication system according to the sixth embodiment, as illustrated in FIG. 21, a radio base station device 21 comprises a permission termination notice transmitting unit 20 that transmits a notice indicating the termination of a permission to use a sequence.

Figure 22:
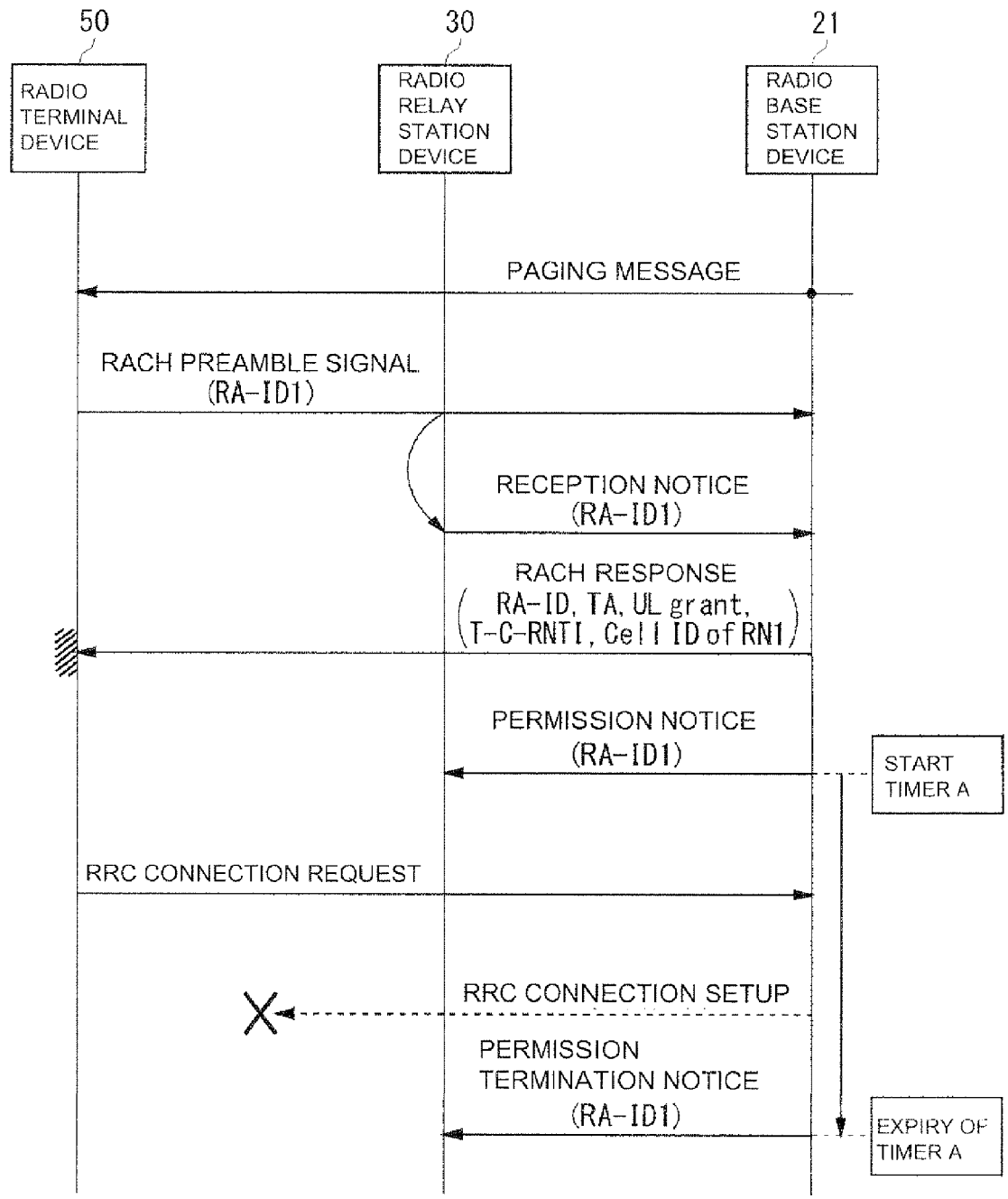
FIG. 22 is a sequence diagram illustrating a random access procedure according to the sixth embodiment.
Figure 23:
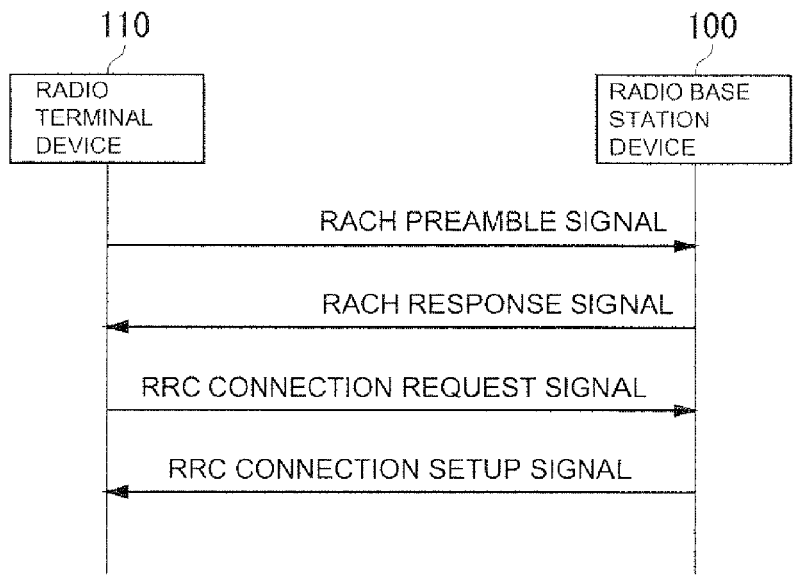
FIG. 23 is a sequence diagram illustrating a conventional random access procedure.
Figure 24:
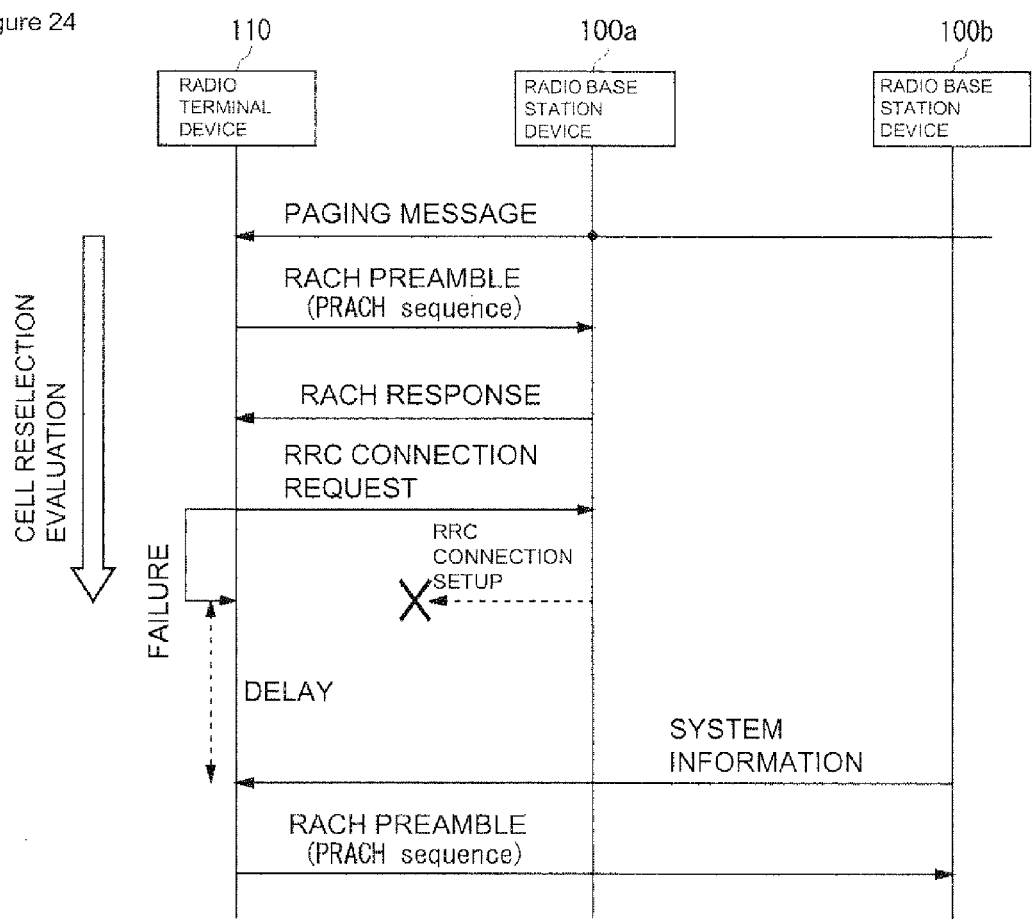
FIG. 24 is a diagram illustrating a sequence for performing a cell reselection during a random access procedure.
Figure 25:
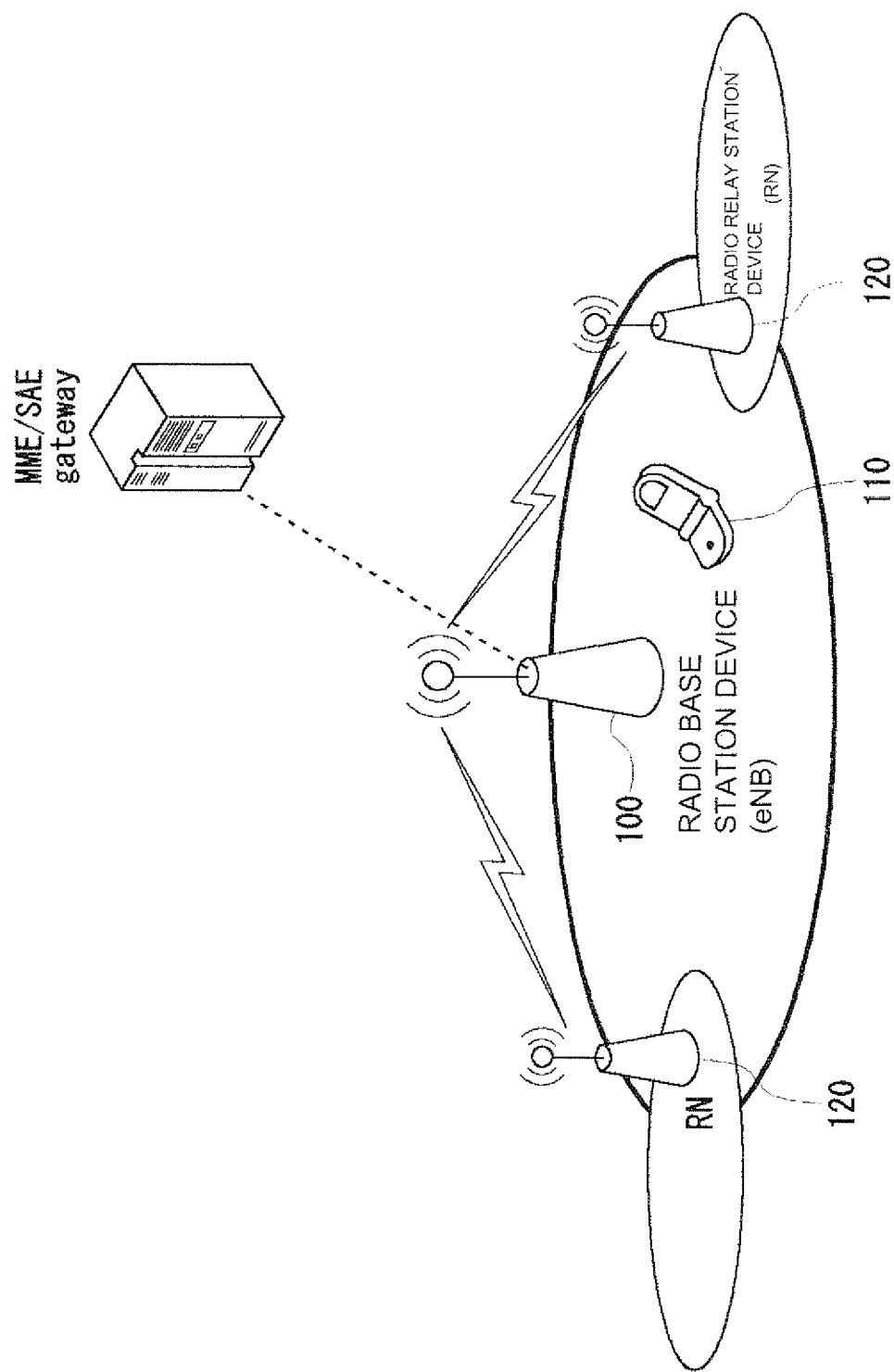
FIG. 25 is a diagram illustrating a deployment of a radio relay station device currently under evaluation.

FIG. 22 is a sequence diagram illustrating a random access procedure according to the sixth embodiment of the present invention. The radio base station device 21 transmits a permission notice (Assigning RACH sequence) for notifying permission to use a sequence to the radio relay station device 30 and, at the same time, starts a timer A by a MAC control unit. Once a prescribed period of time elapses on the timer A, a permission termination notice (Assign RACH sequence terminate) for terminating the permission to use is generated by a MAC control unit 14. The permission termination notice is to comprise a random access identifier corresponding to a preamble sequence for which permission to use is to be terminated. The permission termination notice transmitting unit 20 of the radio base station device 21 transmits the generated permission termination notice to the radio relay station device 30.

In the sixth embodiment, a duration of a permission to use is managed by a timer from the start of operations corresponding to the permission to use, and the permission to use a sequence is terminated upon an expiry of the timer to resume normal operations. Accordingly, an effect can be achieved of limiting a period of time where complicated processing corresponding to the permission to use a sequence is performed.

While there have been described what is at present considered to be preferred embodiments of the present invention, it will be understood that various modifications may be made to the present embodiments, and it is intended that the appended claims cover all such modifications as fall within the true spirit and scope of the present invention.

INDUSTRIAL APPLICABILITY

When provided to a cellular wireless system to which a radio relay station device has been introduced, the present invention advantageously reduces the latency upon establishing a connection and enables efficient use of radio resources, and is utilizable as a radio communication terminal device, a radio communication base station device, a radio communication relay station device, and a connection establishment method or the like.

The invention claimed is:

1. A radio base station device applicable to a wireless communication system comprising the radio base station device (eNodeB) that controls communication with a radio terminal device (User Equipment) and a radio relay station device (Relay Node) that relays communication between the radio base station device and the radio terminal device, the radio base station device comprising:
   a preamble signal receiving unit that receives a random access preamble signal (RACH Preamble) transmitted from the radio terminal device, the radio terminal device comprising an RRC control unit that transmits, upon receiving a random access response signal transmitted from the radio base station device, an RRC connection request to the radio base station device, a best cell searching unit that searches, when an RRC connection by the RRC connection request fails, a best cell whose reception quality is the best, and a preamble signal transmitting unit that transmits, when a cell identifier of the best cell matches a cell identifier comprised in the random access response signal, the random access preamble signal comprising a random access identifier comprised in the random access response signal;
   a reception notice receiving unit that receives, from the radio relay station device, a reception notice indicating that the radio relay station device has received the random access preamble signal; and
   a response signal transmitting unit which permits, when a random access identifier (RA-ID) of a random access preamble signal transmitted from the radio terminal device matches a random access identifier comprised in the reception notice transmitted from the radio relay station device, the use of the matching random access identifier by the radio relay station device and transmits, to the radio terminal device, a random access response signal (RACH Response) comprising a cell identifier (Cell ID) of a cell managed by the radio relay station device permitted to use the random access identifier.

2. The radio base station device according to claim 1, further comprising permission notice transmitting unit that transmits a permission notice indicating permission to use the random access identifier to the radio relay station device.

3. The radio base station device according to claim 1, wherein the radio base station device waits for the reception notice from the radio relay station device until a predetermined period of time lapses from the reception of a random access preamble signal transmitted from the radio terminal device.

4. The radio base station device according to claim 1, wherein when the reception notice comprising the same random access identifier is received from a plurality of radio relay station devices, the radio base station device permits the use of the random access identifier to a radio relay station device selected from the plurality of radio relay station devices.

5. The radio base station device according to claim 1, wherein the response signal transmitting unit judges whether the radio relay station device that is the transmission source of the reception notice is the radio relay station device permitted to use the random access identifier, and when the radio relay station device is the radio relay station device permitted to use the random access identifier, the response signal transmitting unit does not transmit the random access response signal to the radio terminal device.

6. The radio base station device according to claim 1, wherein when a notice indicating that a transmission of a random access response signal corresponding to the random access response signal is unnecessary is received from the radio relay station device permitted to use the random access identifier, the radio base station device does not transmit the random access response signal to the radio terminal device.

7. The radio base station device according to claim 1, wherein the response signal transmitting unit transmits a random access response signal that comprises: a reference value of a transmission power of a random access preamble signal specified by the radio relay station device permitted to use the random access identifier; and a transmission power (RSTP: Reference symbol Transmission Power) of a pilot signal transmitted from the radio relay station device.

8. The radio base station device according to claim 1, wherein based on a reception level comprised in the reception notice and reception characteristics of the radio relay station device, the response signal transmitting unit comprises, in the random access response signal, a control parameter for controlling a transmission power of a random access preamble signal to be transmitted from the radio terminal device to the radio relay station device, and transmits the random access response signal.

9. The radio base station device according to claim 1, further comprising a permission termination notice transmitting unit that transmits, upon the lapse of a predetermined period of time after the transmission of the permission notice from the permission notice transmitting unit to the radio relay station device, a notice indicating a termination of a permission to use the random access identifier granted to the radio relay station device.

10. A radio relay station device applicable to a wireless communication system comprising
   a radio base station device (eNodeB) that controls communication with a radio terminal device (User Equipment), the radio terminal device comprising an RRC control unit that transmits, upon receiving a random access response signal transmitted from the radio base station device, an RRC connection request to the radio base station device, a best cell searching unit that searches, when an RRC connection by the RRC connection request fails, a best cell whose reception quality is the best, and a preamble signal transmitting unit that transmits to the radio base station device, when a cell identifier of the best cell matches a cell identifier comprised in the random access response signal, a random access preamble signal comprising a random access identifier comprised in the random access response signal, and the radio relay station device (Relay Node) that relays communication between the radio base station device and the radio terminal device, the radio relay station device comprising:

a preamble signal receiving unit that receives the random access preamble signal (RACH Preamble) transmitted from the radio terminal device to the radio base station device;

a reception notice transmitting unit that transmits, to the radio base station device, a reception notice which indicates that the random access preamble signal has been received and which comprises a random access identifier of the random access preamble signal;

a permission identifier storage unit that stores, when a permission to use the random access identifier comprised in the random access preamble signal has been granted by the radio base station device, a random access identifier comprised in the random access preamble signal;

a random access identifier judging unit that judges, upon receiving a random access preamble signal transmitted from the radio terminal device, whether or not a random access identifier in the random access preamble signal matches the random access identifier stored in the permission identifier storage unit; and a response signal transmitting unit which transmits, when it is judged that the random access identifiers match each other, a random access response signal corresponding to the matching random access preamble signal to the radio terminal device.

11. The radio relay station device according to claim 10, further comprising a permission notice receiving unit that receives a permission notice indicating that the use of the random access identifier has been permitted by the radio base station device, wherein the radio relay station device stores a random access identifier comprised in the permission notice in the permission identifier storage unit.

12. The radio relay station device according to claim 10, further comprising a response signal receiving unit that receives a random access response signal transmitted from the radio base station device to the radio terminal device, wherein when a random access response signal received by the response signal receiving unit comprises a cell identifier of a cell managed by the radio relay station device, the radio relay station device stores a random access identifier comprised in the random access response signal in the permission identifier storage unit.

13. The radio relay station device according to claim 10, further comprising a transmitting unit that transmits, when the random access identifier judging unit judges that the random access identifiers match each other, a notice indicating that a transmission of a random access response signal corresponding to the random access preamble signal is unnecessary to the radio base station device.

14. The radio relay station device according to claim 10, further comprising a response signal monitoring unit that monitors, when the random access identifier judging unit judges that the random access identifiers match each other, whether or not a random access response signal corresponding to the random access preamble signal has been transmitted from the radio base station device to the radio terminal device, wherein the response signal transmitting unit transmits, when a random access response signal has not been transmitted within a predetermined period of time, a random access response signal corresponding to the random access preamble signal to the radio terminal device.

15. The radio relay station device according to claim 10, further comprising:

a reception level detecting unit that detects a reception level of the random access preamble signal; and a response signal monitoring unit that monitors, when the random access identifier judging unit judges that the random access identifiers match each other, whether or not a random access response signal corresponding to the random access preamble signal has been transmitted from the radio base station device to the radio terminal device, wherein the reception notice transmitting unit comprises a reception level of the random access preamble signal in the reception notice and transmits the reception notice to the radio base station device, and the response signal transmitting unit transmits, when a random access response signal has not been transmitted within a predetermined period of time, a random access response signal corresponding to the random access preamble signal to the radio terminal device.

16. The radio relay station device according to claim 10, wherein when a permission termination notice that notifies a termination of permission to use the random access identifier is received from the radio base station device, the radio relay station device erases a random access identifier corresponding to the permission termination notice from the permission identifier storage unit.

17. A radio terminal device applicable to a wireless communication system comprising a radio base station device (eNodeB) that controls communication with the radio terminal device (User Equipment) and a radio relay station device (Relay Node) that relays communication between the radio base station device and the radio terminal device, the radio terminal device comprising:

a preamble signal transmitting unit that transmits a random access preamble signal;

an RRC control unit that transmits, upon receiving a random access response signal transmitted from the radio base station device in response to the random access preamble signal, an RRC connection request to the radio base station device; and a best cell searching unit that searches, when an RRC connection by the RRC connection request fails, a best cell whose reception quality is the best, wherein the preamble signal transmitting unit transmits, when a cell identifier of the best cell matches a cell identifier comprised in the random access response signal, a random access preamble signal comprising a random access identifier comprised in the random access response signal.

18. The radio terminal device according to claim 17, wherein based on a reference value of a transmission power of a random access preamble signal comprised in the random access response signal and on a transmission power of a pilot signal, the preamble signal transmitting unit transmits the random access preamble signal at a transmission power that is receivable by the radio relay station device but not receivable by the radio base station device.

19. The radio terminal device according to claim 17, wherein the preamble signal transmitting unit transmits the random access preamble signal at a transmission power that is receivable by the radio relay station device but not receivable by the radio base station device based on a control parameter comprised in the random access response signal.

20. A wireless communication system comprising a radio base station device (eNodeB) that controls communication with a radio terminal device (User Equipment) and a radio relay station device (Relay Node) that relays communication between the radio base station device and the radio terminal device, wherein the radio relay station device comprises:
a preamble signal receiving unit that receives a random access preamble signal (RACH Preamble) transmitted from the radio terminal device to the radio base station device; and
a reception notice transmitting unit that transmits, to the radio base station device, a reception notice which indicates that the random access preamble signal has been received and which comprises a random access identifier of the random access preamble signal,
the radio base station device comprises:
a preamble signal receiving unit that receives a random access preamble signal transmitted from the radio terminal device;
a reception notice receiving unit that receives a reception notice from the radio relay station device; and
a response signal transmitting unit which, when a random access identifier (RA-ID) of a random access preamble signal transmitted from the radio terminal device matches a random access identifier comprised in the reception notice transmitted from the radio relay station device, permits the use of the random access identifier by the radio relay station device, and which transmits, to the radio terminal device, a random access response signal (RACH Response) comprising a cell identifier (Cell ID) of a cell managed by the radio relay station device permitted to use the random access identifier,
the radio relay station device further comprises
a permission identifier storage unit that stores, when a permission to use a random access identifier comprised in the random access preamble signal has been granted by the radio base station device, a random access identifier comprised in the random access preamble signal,
the radio terminal device comprises:
an RRC control unit that transmits, upon receiving the random access response signal transmitted from the radio base station device, an RRC connection request to the radio base station device;
a best cell searching unit that searches, when an RRC connection by the RRC connection request fails, a best cell whose reception quality is the best; and
a preamble signal transmitting unit that transmits, when a cell identifier of the best cell matches a cell identifier comprised in the random access response signal, a random access preamble signal comprising a random access identifier comprised in the random access response signal, and
the radio relay station device further comprises:
a random access identifier judging unit that judges, upon reception of the random access preamble signal, whether or not a random access identifier in the random access preamble signal matches a random access identifier stored in the permission identifier storage unit; and
a response signal transmitting unit which transmits, when it is judged that the random access identifiers match each other, a random access response signal corresponding to the random access preamble signal to the radio terminal device.

21. A radio control method of a radio base station device applicable to a wireless communication system comprising the radio base station device (eNodeB) that controls communication with a radio terminal device (User Equipment) and a radio relay station device (Relay Node) that relays communication between the radio base station device and the radio terminal device, the radio control method comprising the steps of:

receiving a random access preamble signal transmitted from the radio terminal device, the radio terminal device comprising an RRC control unit that transmits, upon receiving a random access response signal transmitted from the radio base station device, an RRC connection request to the radio base station device, a best cell searching unit that searches, when an RRC connection by the RRC connection request fails, a best cell whose reception quality is the best, and a preamble signal transmitting unit that transmits, when a cell identifier of the best cell matches a cell identifier comprised in the random access response signal, the random access preamble signal comprising a random access identifier comprised in the random access response signal;
receiving, from the radio relay station device, a reception notice indicating that the radio relay station device has received the random access preamble signal; and
permitting, when a random access identifier (RA-ID) of a random access preamble signal transmitted from the radio terminal device matches a random access identifier comprised in the reception notice transmitted from the radio relay station device, the use of the matching random access identifier by the radio relay station device, and transmitting, to the radio terminal device, a random access response signal (RACH Response) comprising a cell identifier (Cell ID) of a cell managed by the radio relay station device permitted to use the random access identifier.

22. A radio control method of a radio relay station device applicable to a wireless communication system comprising a radio base station device (eNodeB) that controls communication with a radio terminal device (User Equipment) and the radio relay station device (Relay Node) that relays communication between the radio base station device and the radio terminal device, the radio control method comprising the steps of:

receiving a random access preamble signal (RACH Preamble) transmitted from the radio terminal device to the radio base station device, the radio terminal device comprising an RRC control unit that transmits, upon receiving a random access response signal transmitted from the radio base station device, an RRC connection request to the radio base station device, a best cell searching unit that searches, when an RRC connection by the RRC connection request fails, a best cell whose reception quality is the best, and a preamble signal transmitting unit that transmits, when a cell identifier of the best cell matches a cell identifier comprised in the random access response signal, the random access preamble signal comprising a random access identifier comprised in the random access response signal;

transmitting, to the radio base station device, a reception notice which indicates that the random access preamble signal has been received and which comprises a random access identifier of the random access preamble signal;

storing, when a permission to use the random access identifier comprised in the random access preamble signal has been granted by the radio base station device, the random access identifier comprised in the random access response signal;

judging, upon reception of a random access preamble signal transmitted from the radio terminal device, whether or not a random access identifier in the random access preamble signal matches the random access identifier stored in the step of storing the random access identifier; and transmitting, when it is judged that the random access identifiers match each other, a random access response signal corresponding to the matching random access preamble signal to the radio terminal device.

23. A radio control method of a radio terminal device applicable to a wireless communication system comprising a radio base station device (eNodeB) that controls communication with the radio terminal device (User Equipment) and a radio relay station device (Relay Node) that relays communication between the radio base station device and the radio terminal device, the radio control method comprising the steps of:

transmitting a random access preamble signal;

transmitting, upon receiving the random access response signal transmitted from the radio base station device in response to the random access preamble signal, an RRC connection request to the radio base station device; and searching, when an RRC connection by the RRC connection request fails, a best cell whose reception quality is the best, wherein transmitting the random access preamble signal comprises, when a cell identifier of the best cell matches a cell identifier comprised in the random access response signal, transmitting a random access preamble signal comprising a random access identifier comprised in the random access response signal to the radio relay station device.

* * * * *